US012783188B2

(12) United States Patent
Shimakawa

(10) Patent No.: US 12,783,188 B2

(45) Date of Patent: Nov. 3, 2026

(54) IMAGE FORMING APPARATUS THAT CONTROLS INSTALLATION OF AN APPLICATION IN ACCORDANCE WITH A USER'S SUBSCRIPTION PLAN, METHOD FOR CONTROLLING IMAGE FORMING APPARATUS, STORAGE MEDIUM, AND MANAGEMENT SYSTEM

(71) Applicant: CANON KABUSHIKI KAISHA, Tokyo (JP)

(72) Inventor: Yasunori Shimakawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 221 days.

(21) Appl. No.: 18/759,662

(22) Filed: Jun. 28, 2024

(65) Prior Publication Data

US 2025/0013401 A1 Jan. 9, 2025

(30) Foreign Application Priority Data

Jul. 6, 2023 (JP) ................................ 2023-111652

(51) Int. Cl.
*G06F 3/12* (2006.01)

(52) U.S. Cl.
CPC ............ *G06F 3/123* (2013.01); *G06F 3/1222* (2013.01); *G06F 3/1238* (2013.01)

(58) Field of Classification Search
None
See application file for complete search history.

(56) References Cited

U.S. PATENT DOCUMENTS

| | | | | |
|---|---|---|---|---|
| 9,930,194 | B2 * | 3/2018 | Takeda | H04N 1/32 |
| 2008/0244057 | A1 | 10/2008 | Kojima | 709/223 |
| 2014/0211219 | A1 * | 7/2014 | Yabe | H04N 1/4433 358/1.5 |
| 2022/0374180 | A1 * | 11/2022 | Nakajima | G06F 3/1222 |

FOREIGN PATENT DOCUMENTS

JP 2008-242660 10/2008

* cited by examiner

*Primary Examiner* — Andrew H Lam

(74) *Attorney, Agent, or Firm* — Venable LLP

(57) ABSTRACT

Structures capable of reducing the time and effort of installing an application for adding a function corresponding to a plan subscribed by a user, are provided. An image forming apparatus specifies a predetermined application that adds, to the image forming apparatus, a function of the image forming apparatus permitted to be used in a plan subscribed by a user, acquires the specified predetermined application from a management server that manages a plurality of applications, and installs the acquired predetermined application onto the image forming apparatus.

9 Claims, 20 Drawing Sheets

FIG. 6

600

| SUBSCRIPTION TYPE | THE NUMBER OF PRINTABLE SHEETS | SCANNING AVAILABILITY | DASHBOARD APPLICATION | ENCRYPTION SCANNING APPLICATION | DATA-SORTING SCANNING APPLICATION |
|---|---|---|---|---|---|
| PRINT-ONLY PLAN | 1000 SHEETS/MONTH | NOT AVAILABLE | ○ | × | × |
| BASIC PLAN | 1000 SHEETS/MONTH | AVAILABLE | ○ | × | × |
| ENCRYPTION SCANNING PLAN | 1000 SHEETS/MONTH | AVAILABLE | ○ | ○ | × |
| DATA-SORTING SCANNING PLAN | 1000 SHEETS/MONTH | AVAILABLE | ○ | × | ○ |
| ENCRYPTION & DATA-SORTING SCANNING PLAN | 1000 SHEETS/MONTH | AVAILABLE | ○ | ○ | ○ |

IMAGE FORMING APPARATUS THAT CONTROLS INSTALLATION OF AN APPLICATION IN ACCORDANCE WITH A USER'S SUBSCRIPTION PLAN, METHOD FOR CONTROLLING IMAGE FORMING APPARATUS, STORAGE MEDIUM, AND MANAGEMENT SYSTEM

BACKGROUND OF THE INVENTION

Field of the Invention

The present invention relates to image forming apparatuses, methods for controlling the image forming apparatuses, storage media, and management systems.

Description of the Related Art

Image forming apparatuses having a plurality of functions such as a printing function and a scanning function are known. The functions of such an image forming apparatus can be expanded by installing an application onto the image forming apparatus (see Japanese Laid-Open Patent Publication (kokai) No. 2008-242660).

In recent years, services such as rental services and subscription services for printers (image forming apparatuses) have been offered. Such a service allows a user to use a printer provided by a service provider, without purchasing the printer, during a subscription period. Such a service offers multiple plans in which different functions of a printer are usable, and allows users to select the plans that meets their purposes.

Conventionally, installation of an application onto a printer for implementing a function corresponding to a plan subscribed by a user is performed by a service provider or the user, which takes a lot of time and effort.

SUMMARY OF THE INVENTION

The present invention provides systems capable of reducing the time and effort of installing, onto an image forming apparatus, an application for adding a function corresponding to a plan subscribed by a user to the image forming apparatus.

According to an aspect of the invention, an image forming apparatus is communicably connected with a management server that manages a plurality of applications. The image forming apparatus includes a memory storing instructions and at least one processor. The at least one processor executes the instructions to: specify a predetermined application that adds, to the image forming apparatus, a function of the image forming apparatus, permitted to be used in a plan subscribed by a user; acquire the specified predetermined application from the management server; and install the acquired predetermined application onto the image forming apparatus.

According to another aspect of the invention, a management system includes an image forming apparatus, a first server that manages information subscribed by a user, a second server that manages a plurality of applications, a memory storing instructions, and at least one processor. The at least one processor executes the instructions to: specify, on the basis of information managed by the first server, a predetermined application that adds, to the image forming apparatus, a function of the image forming apparatus, permitted to be used in a plan subscribed by a user; acquire the specified predetermined application from the second server; and install the acquired predetermined application onto the image forming apparatus.

According to the present invention, it is possible to reduce the time and effort of installing onto an image forming apparatus an application for adding a function corresponding to a plan subscribed by a user to the image forming apparatus.

Further features of the present invention will become apparent from the following description of exemplary embodiments with reference to the attached drawings.

BRIEF DESCRIPTION OF THE DRAWINGS

FIG. 6 is a diagram illustrating an example of a subscription plan table used in the management system of FIG. 1.

DESCRIPTION OF THE EMBODIMENTS

Figure 1:
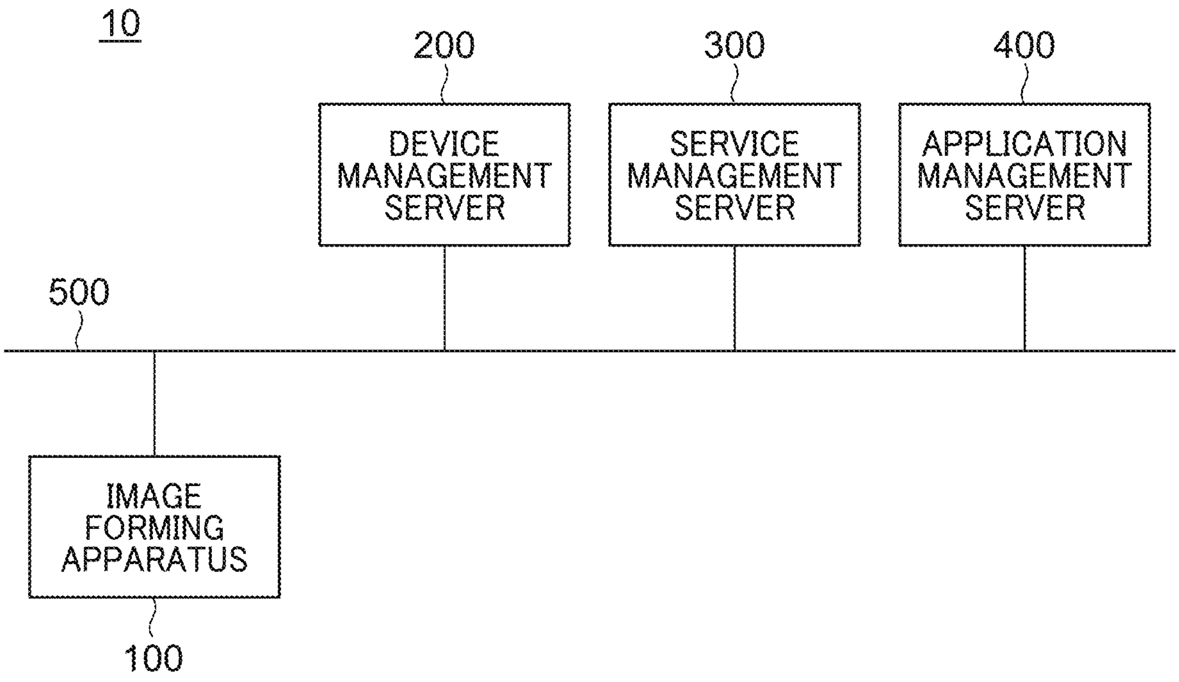
FIG. 1 is a block diagram schematically illustrating a configuration of a management system according to the present embodiment.

The present invention will now be described in detail below with reference to the accompanying drawings showing embodiments thereof.

In the drawings, the same or corresponding component members, component apparatuses, and component parts are denoted by the same reference numerals. It should be noted that the following embodiments do not limit the present invention according to the claims, and all combinations of features described in the present embodiments are not necessarily essential to the solution of the present invention.

First, a management system according to a first embodiment will be described.

FIG. 1 is a block diagram schematically illustrating a configuration of a management system 10 according to the present embodiment. In FIG. 1, the management system 10 includes an image forming apparatus 100, a device management server 200 (first server), a service management server 300 (first server), and an application management server 400 (second server). The image forming apparatus 100, the device management server 200, the service management server 300, and the application management server 400 are communicably connected with each other through a communication network 500 such as the Internet. It should be noted that, in the management system 10, a communication protocol such as Hypertext Transfer Protocol (hereinafter, referred to as "HTTP") is used in communication between these apparatuses.

The management system 10 provides a temporary printer-use service that allows a user to use a printer at low cost on a time determined basis without purchasing the printer. Examples of such a temporary printer-use service includes printer rental services and printer subscription services. A printer rental service is a service for renting, to a user, a printer corresponding to a plan subscribed by the user during the subscription period. A printer subscription service is a service that allows a user to use a printer for a fixed amount up to the maximum number of printable sheets corresponding to the plan subscribed by the user. In the temporary printer-use service, a printer is delivered to a user who has made a use subscription of this service, and the user is allowed to use functions of the printer corresponding to the subscribed plan from among a plurality of plans in FIG. 6 which will be described later.

The image forming apparatus 100 is configured to receive subscription information from the device management server 200, store the subscription information in a storage 114 of FIG. 2 which will be described later, and control availability of the functions of in the image forming apparatus 100 on the basis of the stored subscription information.

The device management server 200 is configured to hold subscription information notified from the service management server 300 and provide the subscription information to the image forming apparatus 100. It should be noted that, in the present embodiment, a configuration in which the image forming apparatus 100 receives the subscription information notified from the service management server 300 through the device management server 200 will be described, but the present invention is not limited to this configuration. For example, the image forming apparatus 100 may be configured to directly receive subscription information from the service management server 300 through the Internet. It should be noted that details of the subscription information and details of control of the image forming apparatus 100 based on the subscription information will be described later.

Figure 2:
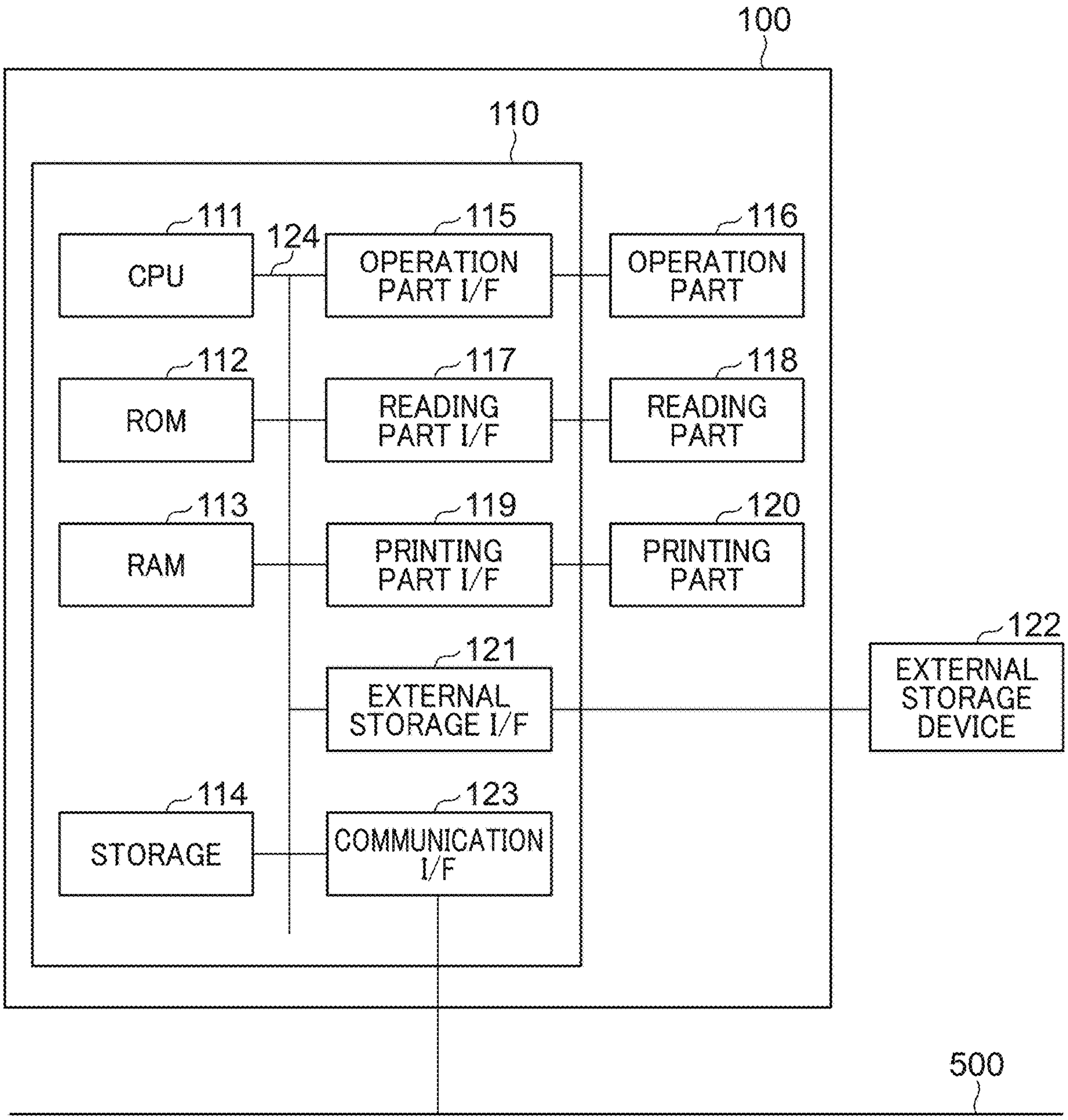
FIG. 2 is a block diagram schematically illustrating a hardware configuration of an image forming apparatus of FIG. 1.

FIG. 2 is a block diagram schematically illustrating a hardware configuration of the image forming apparatus 100 of FIG. 1. In FIG. 2, the image forming apparatus 100 includes a control part 110, an operation part 116, a reading part 118, and a printing part 120. The control part 110 includes a CPU 111, a ROM 112, a RAM 113, a storage 114, an operation part I/F 115, a reading part I/F 117, a printing part I/F 119, an external storage I/F 121, and a communication I/F 123. It should be noted that the CPU is an abbreviation for central processing unit. The ROM stands for Read Only Memory. The RAM stands for Random Access Memory. The CPU 111, the ROM 112, the RAM 113, the storage 114, the operation part I/F 115, the reading part I/F 117, the printing part I/F 119, the external storage I/F 121, and the communication I/F 123 are connected to one another through a system bus 124.

The CPU 111 controls the operation of the image forming apparatus 100. The CPU 111 is configured to read a program stored in the ROM 112 or the storage 114 into the RAM 113 and execute the program. The program is, for example, a control program, and when executing the control program, the CPU 111 performs various controls such as reading control and printing control.

The ROM 112 stores a program executed by the CPU 111. The ROM 112 also stores a boot program, font data, and the like.

The RAM 113 is a main storage memory of the CPU 111. The RAM 113 is used as a work area of the CPU 111 and a temporary storage area for loading programs stored in the ROM 112 and the storage 114. The RAM 113 is also used to temporarily store image data.

The storage 114 stores image data, print data, an address book, shortcuts, various programs, and various setting information. In the present embodiment, a flash memory is assumed as the storage 114, but an auxiliary storage device such as an SSD, an HDD, or an eMMC may be used. It should be noted that the SSD is an abbreviation for solid state drive. The HDD stands for Hard Disk Drive. The eMMC stands for Embedded Multi Media Card.

The operation part I/F 115 is an interface for connecting the operation part 116 to the control part 110. The operation part 116 includes input devices, specifically, a hard key and a touch panel. The touch panel is configured by attaching a touch panel sheet to a display. The operation part 116 is a user interface, and is configured to receive an operation from a user through a hardware key or display a screen through a touch panel.

The reading part I/F 117 is an interface for connecting the reading part 118 to the control part 110. The reading part 118 is configured to read an image of a document and generate image data. The image data generated by the reading part 118 is subjected to character recognition processing, transmitted to an external apparatus, or printed on printing sheets or the like.

The printing part I/F 119 is an interface for connecting the printing part 120 to the control part 110. The CPU 111 is configured to transfer image data to be printed (target image data for printing) to the printing part 120 through the printing part I/F 119. The printing part 120 is configured to print an image on a printing sheet fed from a sheet feeding cassette. A method for printing images may be an electrophotographic method for printing images using toner, or an inkjet method for printing images using ink.

The external storage I/F 121 is an interface for connecting the external storage device 122 to the control part 110. The CPU 111 is configured to store image data in the external storage device 122 through the external storage I/F 121. In the present embodiment, a USB interface is assumed as the external storage I/F 121, and a USB memory is assumed as the external storage device 122, but the present invention is not limited thereto. For example, an SD card or the like may be used as the external storage device 122.

The control part 110 is connected to the communication network 500 by the communication I/F 123. The communication network 500 is, for example, a LAN. It should be noted that the LAN is an abbreviation for Local Area Network. The communication I/F 123 controls transmission and reception of data performed through the communication network 500. For example, the communication I/F 123 is connected to an external apparatus through a USB or a network. That is, the network connection part 105 is connected to a USB or a network to communicate with an external apparatus. In the present embodiment, the image forming apparatus 100 uses the communication I/F 123 to communicate with the device management server 200, the service management server 300, and the application management server 400 through the communication network 500.

Figure 3:
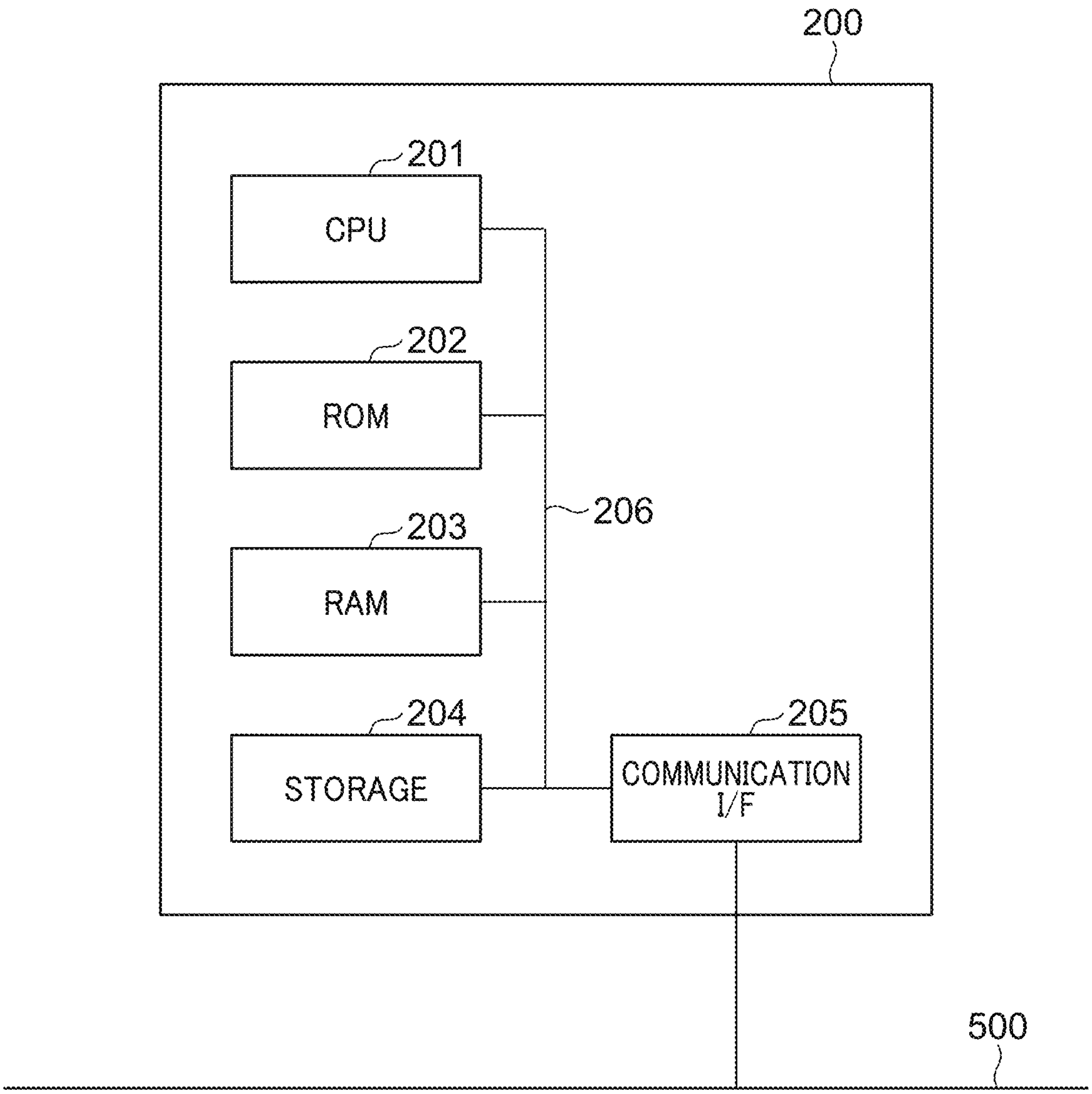
FIG. 3 is a block diagram schematically illustrating a hardware configuration of a device management server in FIG. 1.

FIG. 3 is a block diagram schematically illustrating a hardware configuration of the device management server 200 of FIG. 1. In FIG. 3, the device management server 200 includes a CPU 201, a ROM 202, a RAM 203, a storage 204, and a communication I/F 205. The CPU 201, the ROM 202, the RAM 203, the storage 204, and the communication I/F 205 are connected to one another through a system bus 206.

The CPU 201 performs processing such as calculation, determination, and control of data and instructions according to software stored in the ROM 202, the RAM 203, or the storage 204. The RAM 203 is used as a temporary storage area when the CPU 201 performs various processing. The storage 204 stores an operating system (OS), application software, a program, and the like. The storage 204 further stores device information of the image forming apparatus to be managed and subscription information of each service. The communication I/F 205 uses a wireless LAN or a wired LAN corresponding to a standard such as IEEE802.11a, and exchanges data with a device on the same network or the Internet using a protocol such as TCP/IP.

Figure 4:
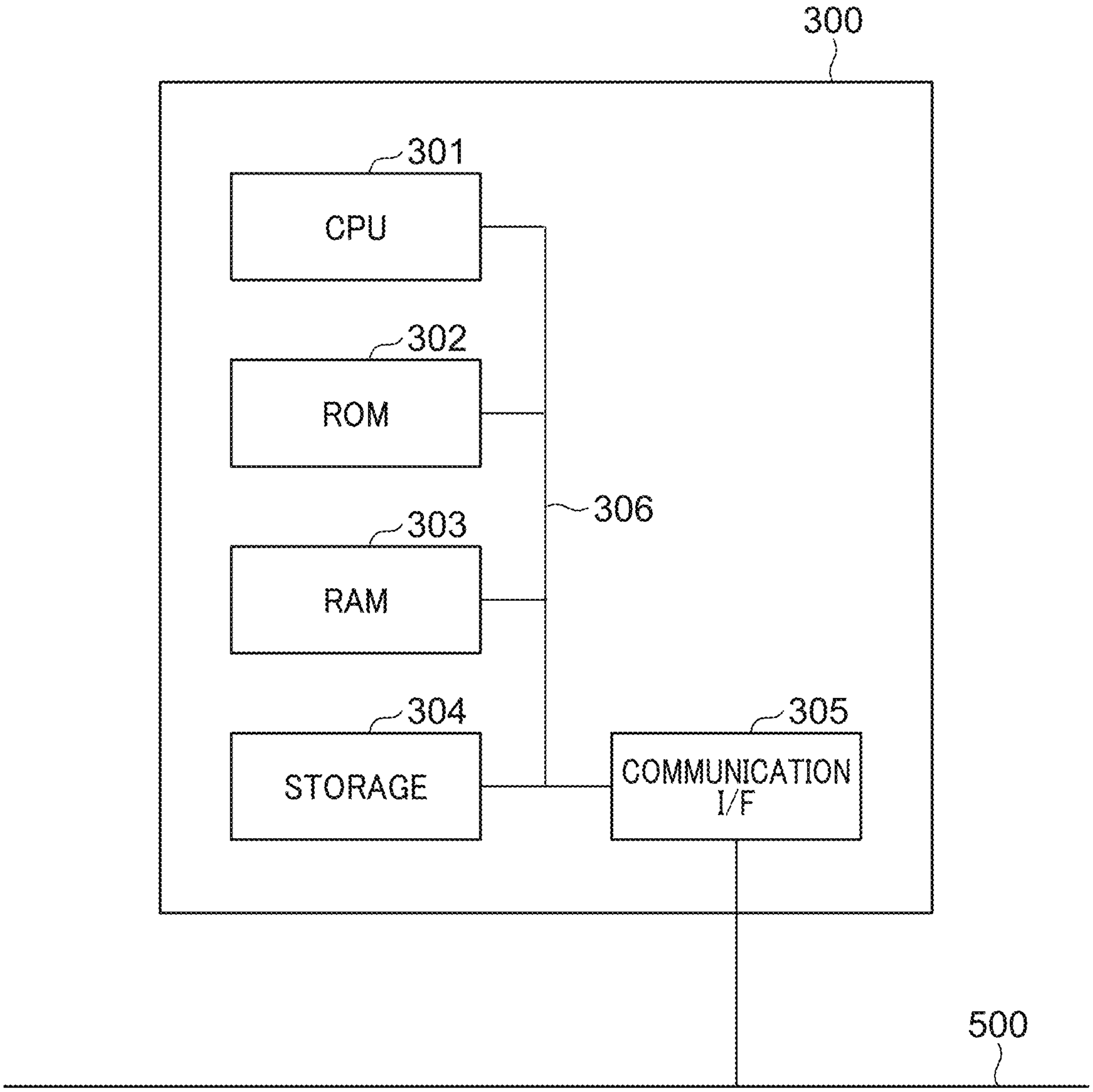
FIG. 4 is a block diagram schematically illustrating a hardware configuration of a service management server in FIG. 1.

FIG. 4 is a block diagram schematically illustrating a hardware configuration of the service management server 300 in FIG. 1. In FIG. 4, the service management server 300 includes a CPU 301, a ROM 302, a RAM 303, a storage 304, and a communication I/F 305, which are connected to each other through a system bus 306.

Although the programs (processes) to be executed by the service management server 300 and the device management server 200 are different, the hardware configurations are basically the same or similar. Therefore, the description of the hardware configuration of the service management server 300 is equivalent to the description of the hardware configuration of the device management server 200, and the description thereof will be omitted here.

Figure 5:
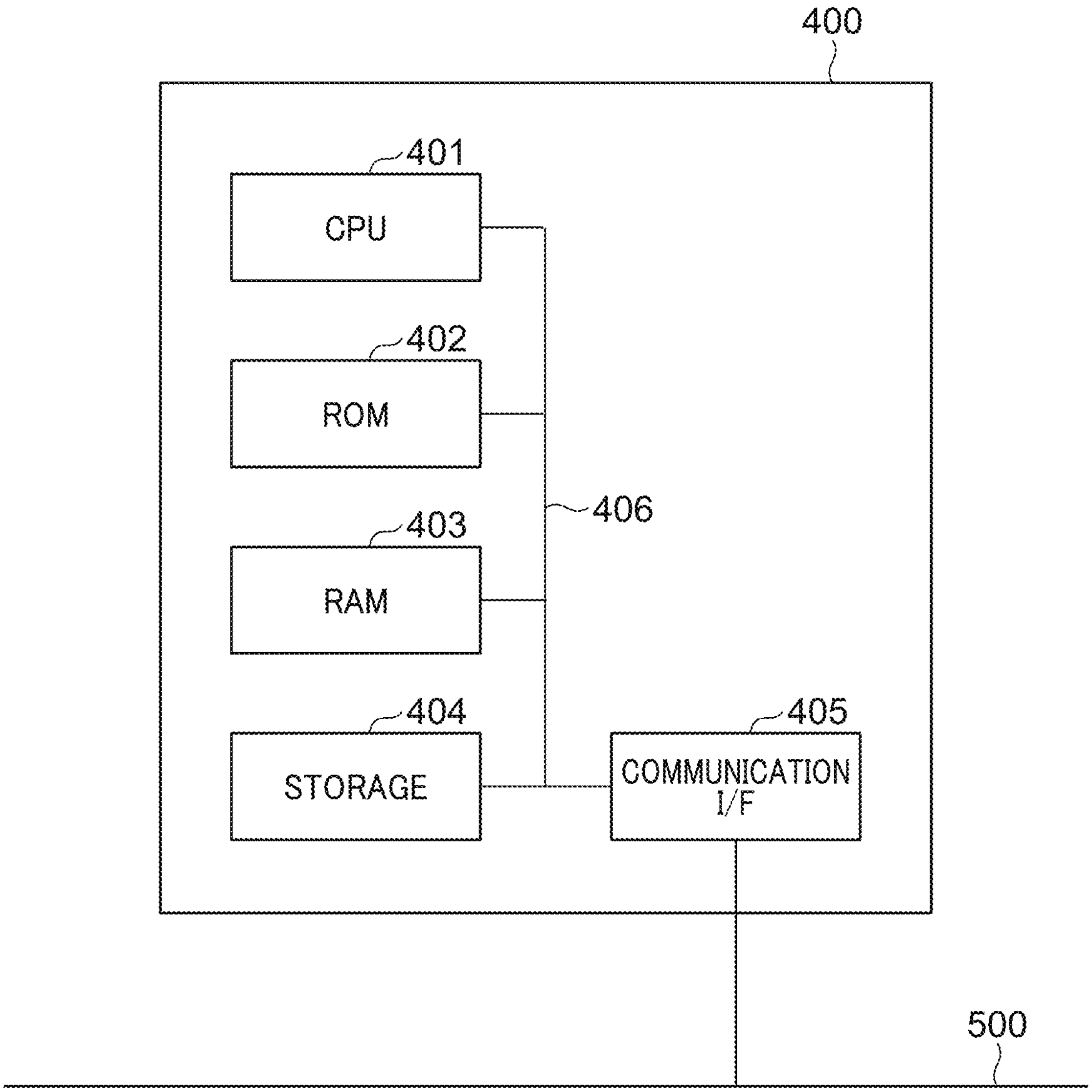
FIG. 5 is a block diagram schematically illustrating a hardware configuration of an application management server of FIG. 1.

FIG. 5 is a block diagram schematically illustrating a hardware configuration of the application management server 400 of FIG. 1. In FIG. 5, the application management server 400 includes a CPU 401, a ROM 402, a RAM 403, a storage 404, and a communication I/F 405, which are connected to each other through a system bus 406.

Although the programs (processes) to be executed by the application management server 400 and the device management server 200 are different, the hardware configurations are basically the same or similar. Therefore, the description of the hardware configuration of the application management server 400 is equivalent to the description of the hardware configuration of the device management server 200, and the description thereof will be omitted here.

It should be noted that, in the present embodiment, a configuration in which the device management server 200, the service management server 300, and the application management server 400 are separate apparatuses will be described, but the present invention is not limited to this configuration. For example, the functions of the device management server 200, the service management server 300, and the application management server 400 may be realized by one server. Alternatively, the functions of the device management server 200, the service management server 300, and the application management server 400 may be realized by a server system including four or more servers. Furthermore, the functions of the device management server 200, the service management server 300, and the application management server 400 may be realized using a server or servers on a cloud.

FIG. 6 is a diagram illustrating an example of a subscription plan table 600 used in the management system 10 of FIG. 1. In the present embodiment, a user is allowed to subscribe to any one of a print-only plan, a basic plan, an encryption scanning plan, a data-sorting scanning plan, and an encryption and data-sorting scanning plan as a temporary printer-use service plan.

The subscription plan table 600 (management data) includes the names of these plans, the numbers of printable sheets in the respective plans, information indicating availability of the scanning function in the respective plans, and information indicating an application permitted to be used in the respective plans. In the subscription plan table 600 of FIG. 6, O indicates that a certain function is available in the selected plan, and X indicates that a certain function is not available in the selected plan.

In the present embodiment, as an example, it is assumed that the printing function can be used in all the plans described above, and the maximum number of printable sheets per month is set to 1000 in all the plans.

It is assumed that the management function by the dashboard application is available in all the plans described above. The dashboard application is an application for managing the image forming apparatus 100 from an external apparatus. It should be noted that, to use the management function by the dashboard application, the dashboard application needs to be installed onto the image forming apparatus 100.

It should be noted that the plans described above are provided for example purposes only, and other plans such as a scan only plan may be included in the temporary printer-use service.

In the basic plan, the encryption scanning plan, the data-sorting scanning plan, and the encryption and data-sorting scanning plan among the plans described above, a scanning function is also available in addition to the printing function.

In the encryption scanning plan and the encryption and data-sorting scanning plan, an encryption scanning function, which is an extended scanning function, can also be used. It should be noted that, to use the encryption scanning function, it is necessary to install an encryption scanning application onto the image forming apparatus 100. The encryption scanning application is an application for extending the original scanning function (for adding an extensional function to the scanning function), that is, an application that implements an encryption scanning function of encrypting image data generated by reading a document image and then transmitting the encrypted image data to an external apparatus.

On the other hand, in the data-sorting scanning plan and the encryption and data-sorting scanning plan, a data-sorting scanning function, which is another extended scanning function, can also be used. It should be noted that, to use the data-sorting scanning function, it is necessary to install a data-sorting scanning application onto the image forming apparatus 100. The data-sorting scanning application is an application for extending the original scanning function (for adding an extensional function to the scanning function), that is, an application that implements a data-sorting scanning function that automatically sorts or distributes image data generated by reading document images into storage locations.

The subscription plan table 600 is stored in the storage 304 of the service management server 300. In the first embodiment, the service management server 300 generates, on the basis of the subscription plan table 600, subscription information including information on a plan (hereinafter referred to as "subscription plan") with which a user has subscribed, and notifies the image forming apparatus 100 of the subscription information through the device management server 200.

Figure 7:
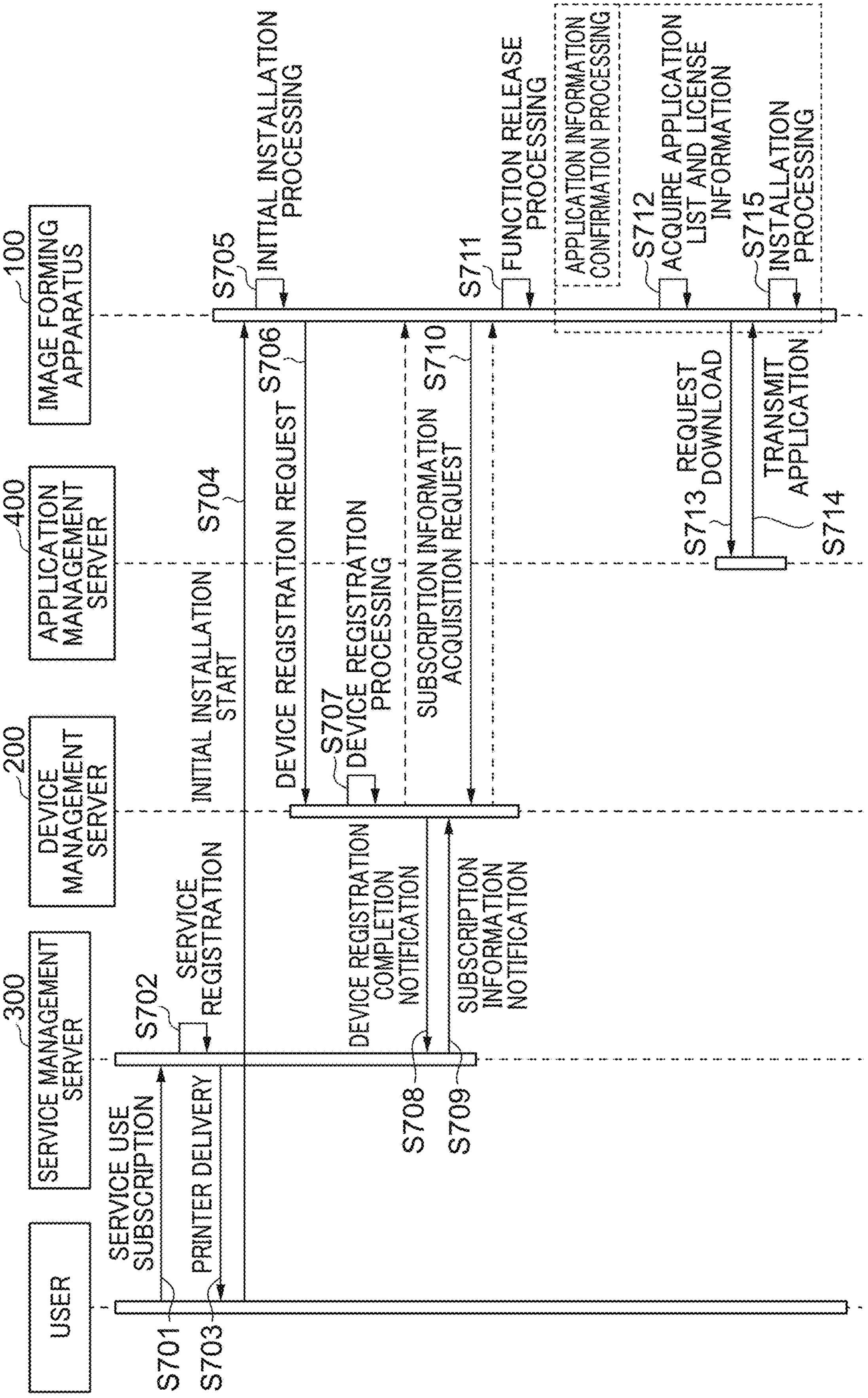
FIG. 7 is a sequence diagram illustrating a procedure for allowing a user to start using a temporary printer-use service in a management system according to a first embodiment.

FIG. 7 is a sequence diagram illustrating a procedure for allowing a user to start using the temporary printer-use service in the management system 10 according to the first embodiment.

In FIG. 7, first, a user accesses a site managed by the service management server 300 from a communication apparatus such as a PC and then makes a use subscription of a temporary printer-use service (S701, where "S" indicates a step). Specifically, the user subscribes to any one of the print-only plan, the basic plan, the encryption scanning plan, the data-sorting scanning plan, and the encryption and data-sorting scanning plan described above.

Next, the service management server 300 performs service registration (S702). In the service registration, information on the user who has made a use subscription of the temporary printer-use service (hereinafter, simply referred to as a "user") and information on a subscription plan selected by the user are registered in association with a printer delivered to the user. The information on the subscription plan includes the name of the subscription plan, the maximum number of printable sheets per month in the subscription plan, and information indicating availability of the basic functions of the image forming apparatus 100 in the subscription plan (hereinafter, referred to as "availability information of the basic functions"). The basic functions are, for example, a printing function, a copying function, and a scanning function. The information on the subscription plan includes list information (hereinafter, referred to as an "application list") of applications for implementing functions of the image forming apparatus 100, permitted to be used in the subscription plan, such as a dashboard application, an encryption scanning application, and a data-sorting scanning application.

Next, the service management server 300 arranges the delivery of the printer registered in S702. As a result, the image forming apparatus 100, which is the printer registered in S702, is delivered to the user (S703).

The user who has received the image forming apparatus 100 starts initial installation of the image forming apparatus 100 (S704). The image forming apparatus 100 performs initial installation processing according to a user's instruction (S705). In the initial setting processing, initial settings including network settings for connection to the Internet are made. When the connection to the communication network 500 is completed by the network settings, the image forming apparatus 100 transmits a device registration request to the device management server 200 (S706). The image forming apparatus 100 also transmits identification information including a product serial number of the image forming apparatus 100 to the device management server 200.

The device management server 200 that has received the device registration request performs device registration processing of registering the identification information received from the image forming apparatus 100 (S707). Next, the device management server 200 returns the result of the device registration processing to the image forming apparatus 100. The device management server 200 transmits a device registration completion notification including the identification information of the registered image forming apparatus 100 to the service management server 300 (S708).

Upon receiving the device registration completion notification, the service management server 300 creates subscription information and notifies the device management server 200 of the created subscription information (S709). The subscription information is information used for activation at the time of initial setting of the image forming apparatus 100 indicated by the identification information included in the device registration completion notification, and includes information for determining that a subscription has been concluded. The subscription information further includes an application list included in the information on the subscription plan registered in association with the image forming apparatus 100, and license information of the application indicated by the application list.

The device management server 200 holds the subscription information notified from the service management server 300 in the storage 204 or the like of the device management server 200, and waits until receiving an acquisition request for the subscription information from the image forming apparatus 100.

On the other hand, the image forming apparatus 100 that has received the result of the device registration processing transmits a request for acquiring the subscription information to the device management server 200 (S710).

In accordance with the received subscription information acquisition request, the device management server 200 notifies the image forming apparatus 100 of the held subscription information with an HTTP response.

The image forming apparatus 100 performs function release processing in FIG. 9 which will be described later on the basis of the received subscription information (S711), and controls the basic functions permitted to be used in the subscription plan to be available. In the present embodiment, at a stage of starting the process of S711, all the basic functions including the printing function, the scanning function, and the copying function of the image forming apparatus 100 are restricted to be unusable. The process of S711 is performed so that among the printing function, the scanning function, and the copying function, only the basic function(s) permitted to be used in the subscription plan can be used. For example, in a case where the user subscribes to the "basic plan", all of the printing function, the scanning function, and the copying function are available by S711. On the other hand, in a case where the user subscribes to the "print-only plan", only the printing function among the printing function, the scanning function, and the copying function becomes available by S711.

It should be noted that, in the present embodiment, at a stage of completing S711, none of the dashboard application, the encryption scanning application, and the data-sorting scanning application is installed onto the image forming apparatus 100. In the image forming apparatus, application information confirmation processing in FIG. 10 which will be described later is executed in order to install an application corresponding to the subscription plan. It should be noted that, as to FIG. 7, as an outline of the application information confirmation processing, processes of S712 and S715 which are some of the processes of the application information confirmation processing will be described, and the other processes will be described later.

In S712, the image forming apparatus 100 acquires the application list and the license information from the subscription information. Next, the image forming apparatus 100 transmits a download request of the application indicated in the application list to the application management server 400 (S713). The image forming apparatus 100 also transmits the license information acquired in S712 to the application management server 400.

In a case where there is no problem in the received license information (in a case where the license information is valid), the application management server 400 that has received the download request transmits an application corresponding to the download request to the image forming apparatus 100 (S714).

The image forming apparatus 100 performs installation processing of installing the application downloaded from the application management server 400 (S715). As a result, in the image forming apparatus 100, the use is allowed to use functions permitted to be used in the subscription plan, such as a management function by the dashboard application, an encryption scanning function, and a data-sorting scanning function. It should be noted that the installed application is executed in a case where the image forming apparatus 100 checks the license information stored in the storage 114 at the time of activation of the application and the license information is valid.

Figure 8:
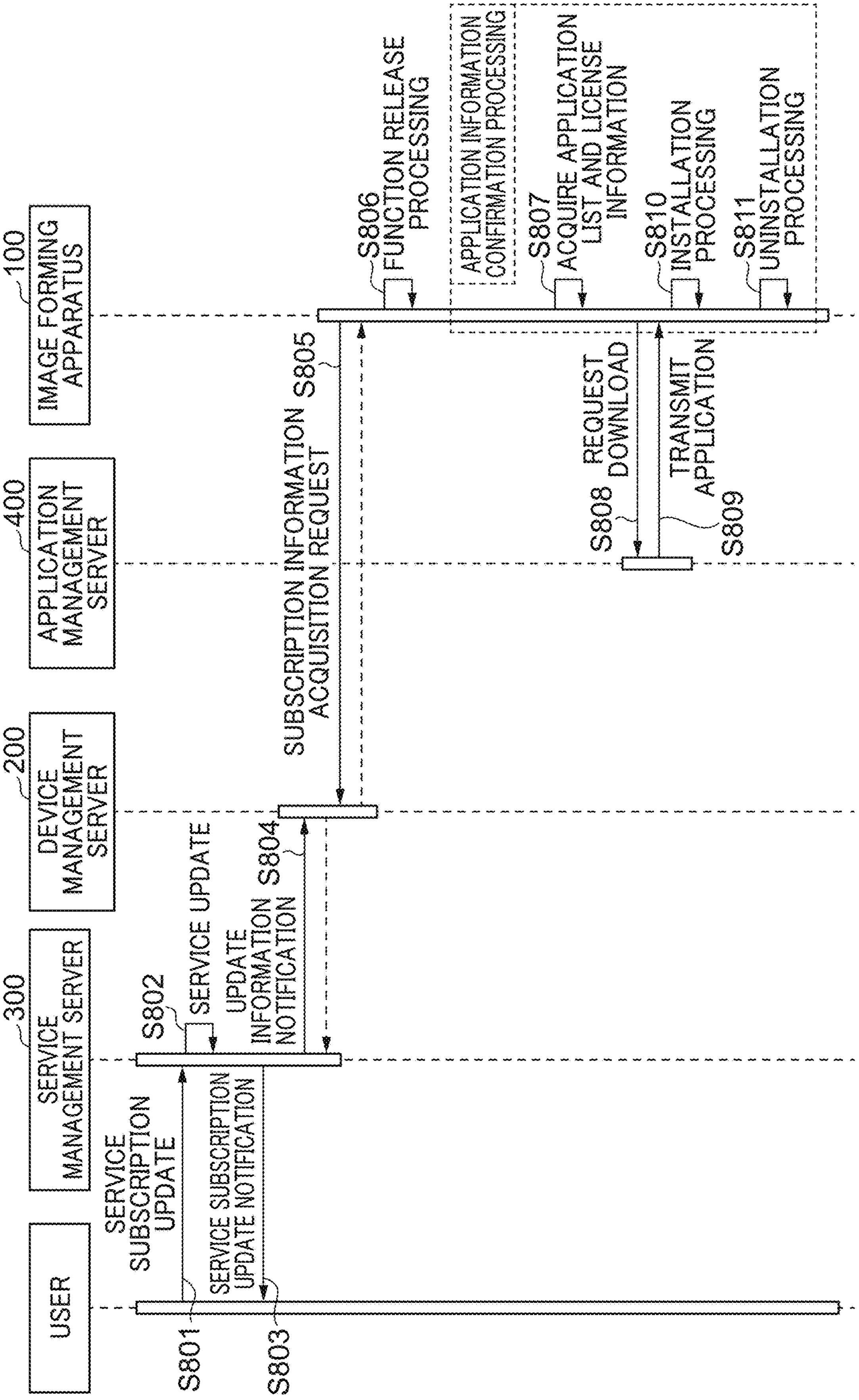
FIG. 8 is a sequence diagram illustrating a procedure for allowing a user to update the subscription of the temporary printer-use service in the management system according to the first embodiment.

FIG. 8 is a sequence diagram illustrating a procedure for allowing a user to update the subscription of the temporary printer-use service in the management system 10 according to the first embodiment. It should be noted that the processes in FIG. 8 are performed at a predetermined timing between the completion of the processes in FIG. 7 described above and the reaching of the subscription period corresponding to the subscription plan.

In FIG. 8, the user accesses a site managed by the service management server 300 from a communication apparatus such as a PC and updates the subscription to the temporary printer-use service (S801). In the subscription update, for example, the subscription period is extended or the plan is changed to another plan.

The service management server 300 performs service update processing of updating the information registered in S702 on the basis of the update contents input by the user (S802). Next, the service management server 300 transmits a service subscription update notification to the communication apparatus of the user (S803). The service subscription update notification includes update information indicating updated contents. In addition, the service management server 300 notifies the device management server 200 of the update information (S804).

On the other hand, the image forming apparatus 100 transmits a request for acquiring the subscription information to the device management server 200 (S805). It should be noted that the process of S805 is periodically performed at a predetermined interval set in advance after the above-described processes in FIG. 7 are completed.

The device management server 200 transmits the subscription information to the image forming apparatus 100 in accordance with the received acquisition request. For example, in a case where the subscription is updated in S801 to change from the "basic plan" to the "encryption and data-sorting scanning plan", the subscription information includes an application list to which an encryption scanning application and a data-sorting scanning application have been newly added, and license information on these applications. In another case where the "encryption and data-sorting scan" is changed to the "basic plan" in the subscription update in S801, the subscription information includes an application list from which the encryption scanning application and the data-sorting scanning application have been deleted, and a request for disabling the license information on these applications.

Next, the image forming apparatus 100 performs function release processing in FIG. 9 which will be described later on the basis of the received subscription information (S806). For example, in a case where the "print-only plan" is changed to the "basic plan" in the subscription update in S801, the user is allowed by the process of S806 to use all of the printing function, the scanning function, and the copying function. In another case where the "print only plan" is changed from the "basic plan" in the subscription update in S801, the user is allowed by the process of S806 to use only the printing function among the printing function, the scanning function, and the copying function.

Next, the image forming apparatus 100 performs application information confirmation processing in FIG. 10 which will be described later. It should be noted that, as to FIG. 8, as an outline of application information confirmation processing which will be described later, processes of S807, S810, and S811, which are some of the processes of the application information confirmation processing, will be described, and the other processes will be described later.

In S807, the image forming apparatus 100 acquires the application list and the license information from the subscription information. It should be noted that, in a case where the subscription information includes the invalidation request for the license information, the image forming apparatus 100 also acquires the invalidation request in S807. In a case where the application list acquired in S807 includes an application not installed onto the image forming apparatus 100, the image forming apparatus 100 performs the process of S808. In S808, the image forming apparatus 100 transmits a download request of the application to the application management server 400. The image forming apparatus 100 also transmits the license information of the application acquired in S807 to the application management server 400.

In a case where there is no problem in the received license information, the application management server 400 that has received the download request transmits an application corresponding to the download request to the image forming apparatus 100 (S809).

The image forming apparatus 100 installs the application downloaded from the application management server 400 (S810). Further, the image forming apparatus 100 uninstalls an unnecessary application (S811). The unnecessary application is an application corresponding to the invalidation request for the license information acquired in S807 among the applications installed onto the image forming apparatus 100. It should be noted that, in a case where the temporary printer-use service is cancelled in the subscription update in S801, all of the dashboard application, the encryption scanning application, and the data-sorting scanning application installed in the process of FIG. 7 are uninstalled. Thereafter, the processes in FIG. 8 end.

Figure 9:
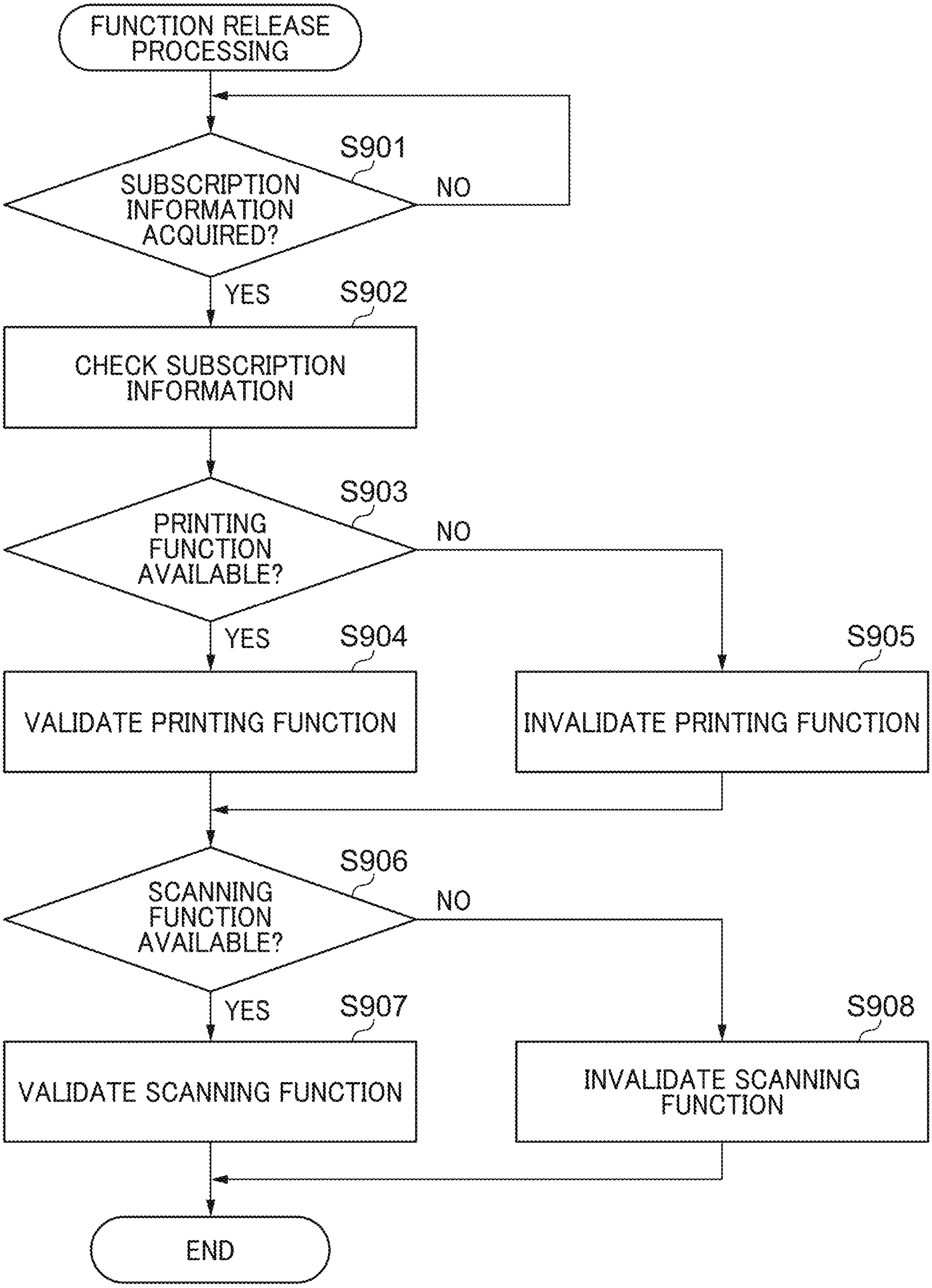
FIG. 9 is a flowchart illustrating a procedure of function release processing in S711 of FIGS. 7 and S806 of FIG. 8.

FIG. 9 is a flowchart illustrating a procedure of the function release processing in S711 of FIGS. 7 and S806 of FIG. 8. The function release processing in FIG. 9 is realized by the CPU 111 of the image forming apparatus 100 executing a program stored in the ROM 112 or the like.

In FIG. 9, the CPU 111 determines whether or not subscription information has been acquired from the device management server 200 (S901). The CPU 111 waits until the subscription information is acquired. Upon acquiring the subscription information (YES in S901), the CPU 111 checks the acquired subscription information (S902). Next, the CPU 111 determines whether or not the printing function is available in the subscription plan on the basis of the availability information of the basic functions included in the subscription information (S903).

In a case where it is determined in S903 that the printing function is available in the subscription plan, the CPU 111 validates the printing function (S904). Next, the function release processing proceeds to S906 which will be described later.

In a case where it is determined in S903 that the printing function is not available in the subscription plan, the CPU 111 invalidates the printing function (S905). Next, the function release processing proceeds to S906 which will be described later.

In S906, the CPU 111 determines whether or not the scanning function is available in the subscription plan on the basis of the availability information of the basic functions included in the subscription information.

In a case where it is determined in S906 that the scanning function is available in the subscription plan, the CPU 111 validates the scanning function (S907) and terminates the present processing.

In a case where it is determined in S906 that the scanning function is not available in the subscription plan, the CPU 111 invalidates the scanning function (S908) and terminates the present processing.

Figure 10:
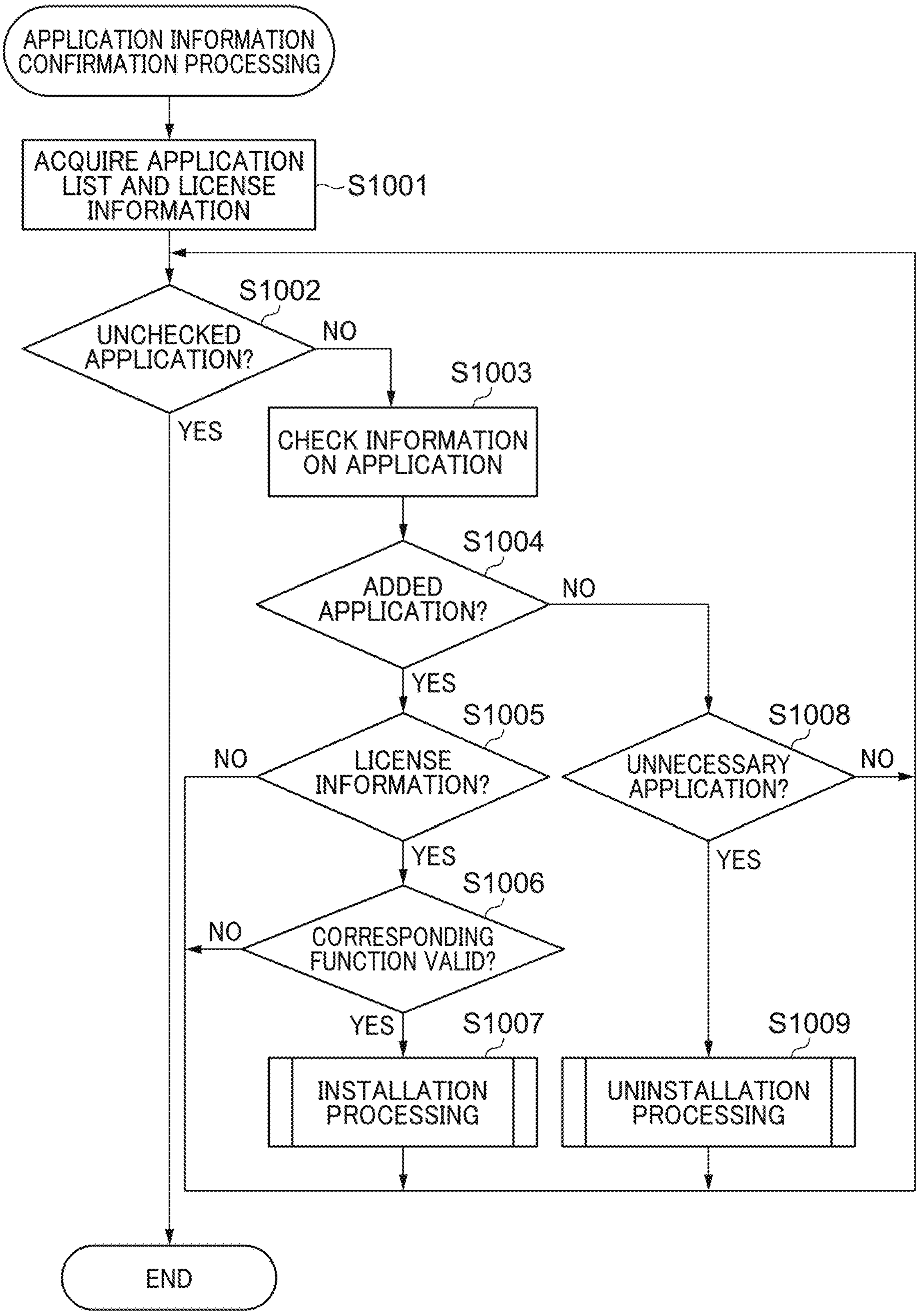
FIG. 10 is a flowchart illustrating a procedure of application information confirmation processing executed in the image forming apparatus of FIG. 1.

FIG. 10 is a flowchart illustrating a procedure of application information confirmation processing executed in the image forming apparatus 100 of FIG. 1. The application information confirmation processing in FIG. 10 includes S712, S715, S807, S810, and S811 described above. The application information confirmation processing in FIG. 10 is realized by the CPU 111 of the image forming apparatus 100 executing a program stored in the ROM 112 or the like.

In FIG. 10, the CPU 111 acquires an application list and license information from the received subscription information (S1001) (see, for example, the processes of S712 and S807 described above). It should be noted that, in a case where the subscription information includes the invalidation request of the license information, the CPU 111 also acquires the invalidation request in S1001.

Next, the CPU 111 determines whether or not there is an application (hereinafter, referred to as "unchecked application") that has not been checked in S1003 which will be described later (S1002). In S1002, for example, the CPU 111 creates a processing target list by adding the application indicated by the application list acquired in S1001 to the applications installed onto the image forming apparatus 100. The CPU 111 determines whether or not there is an unchecked application in the processing target list.

In a case where it is determined in S1002 that there is an unchecked application, the CPU 111 specifies one application from the unchecked applications in the processing target list. The CPU 111 checks information of the specified application in the received subscription information (S1003). Next, the CPU 111 determines whether or not the specified application is an application not installed onto the image forming apparatus 100, that is, an application newly added to the processing target list (S1004).

In a case where it is determined in S1004 that the specified application is a newly added application, the CPU 111 determines whether or not license information corresponding to the specified application has been acquired in S1001 (S1005).

In a case where it is determined in S1005 that the license information corresponding to the specified application has been acquired in S1001, the CPU 111 determines whether or not the function corresponding to the specified application is valid (S1006). As an example, a description is given of a case where the specified application is an encryption scanning application or a data-sorting scanning application. In a case where the scanning function is validated by the function release processing described above, the CPU 111 determines in S1006 that the function corresponding to the specified application is valid. In another case where the scanning function is invalidated by the function release processing described above, the CPU 111 determines in S1006 that the function corresponding to the specified application is not valid. It should be noted that, in a case where the specified application is a dashboard application, the corresponding function is always determined to be valid, and in S1006, the CPU 111 determines that the function corresponding to the specified application is valid.

In a case where it is determined in S1006 that the function corresponding to the specified application is not valid, the application information confirmation processing returns to S1002. Also, in a case where it is determined in S1005 that the license information corresponding to the specified application is not acquired in S1001, the application information confirmation processing returns to S1002. As described above, in the present embodiment, in a case where the function corresponding to the specified application is not valid, or in a case where the license information corresponding to the specified application is not included in the subscription information, the specified application is not installed.

As an example of a case where the function corresponding to the specified application is not valid, there is a case where the image forming apparatus 100 does not have a scanning function and a plan that allows a user to use a function obtained by extending the scanning function (by adding an extension function to the scanning function) such as an encryption scanning plan is subscribed. A situation will be considered where the image forming apparatus 100 having no scanning function is delivered to a user while the user subscribes to a print-only plan at the time of subscribing to a temporary printer-use service. In such a situation, when the plan is changed to the encryption scanning plan by subscription update, the image forming apparatus 100 has no scanning function and thus the scanning function is not validated, which results in that the CPU 111 determines in S1006 that the function corresponding to the specified application is not valid.

As described above, in a case where, for the image forming apparatus 100 having no scanning function, a user subscribes to a plan that allows the user to use a function obtained by extending the scanning function, the CPU 111 performs the control such that an application for implementing the extended function is not installed onto the image forming apparatus 100. As a result, it is possible to prevent an application for implementing a function unavailable to the user from being unnecessarily installed onto the image forming apparatus 100.

In a case where such control is performed, a notification screen including a message such as "The encryption scanning function is not available with this model, so please change the model." may be displayed on the operation part 116 of the image forming apparatus 100, for example.

In a case where it is determined in S1006 that the function corresponding to the specified application is valid, the CPU 111 performs installation processing in FIG. 11 which will be described later (S1007), and installs the specified application. Thereafter, the application information confirmation processing returns to S1002.

In a case where it is determined in S1004 that the specified application is not a newly added application, the application information confirmation processing proceeds to S1008. In S1008, the CPU 111 determines whether or not the specified application is an application not included in the application list acquired in S1001, that is, an unnecessary application (S1008).

In a case where it is determined in S1008 that the specified application is not an unnecessary application (No in S1008), the application information confirmation processing returns to S1002. In another case where it is determined in S1008 that the specified application is an unnecessary application (Yes in S1008), the CPU 111 performs uninstallation processing in FIG. 12 which will be described later (S1009), and uninstalls the specified application. Thereafter, the application information confirmation processing returns to S1002.

In this manner, the above-described processes are performed on all the applications in the processing target list, and in a case where it is determined in S1002 that there is no unchecked application, the application information confirmation processing ends.

Figure 11:
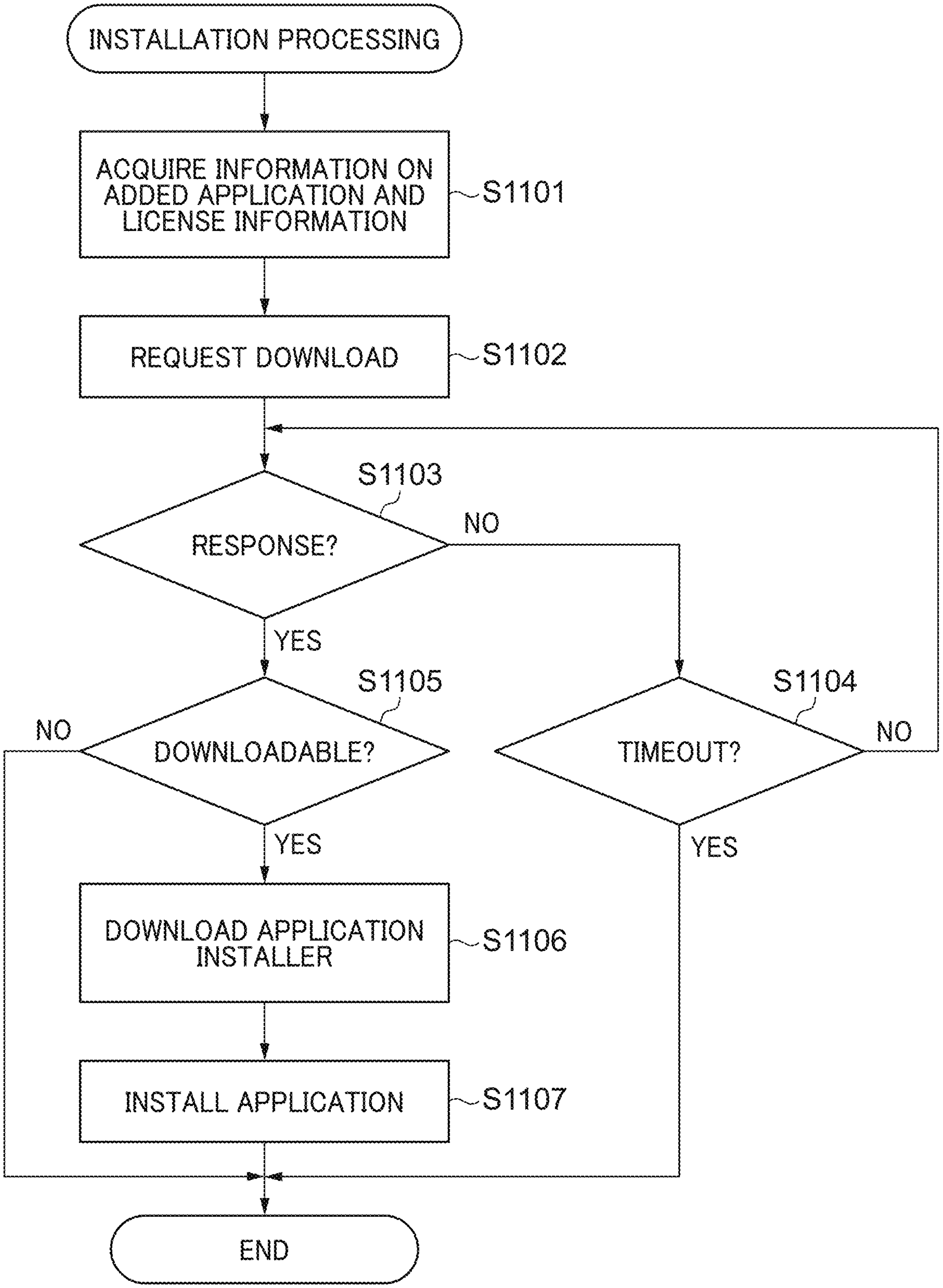
FIG. 11 is a flowchart illustrating a procedure of installation processing in S1007 of FIG. 10.

FIG. 11 is a flowchart illustrating a procedure of installation processing in S1007 of FIG. 10.

In FIG. 11, the CPU 111 acquires information on the newly added application and license information on the application from the acquired subscription information (S1101). Next, the CPU 111 transmits a download request of the newly added application to the application management server 400 (S1102). The CPU 111 also transmits the license information acquired in S1101 to the application management server 400. Next, the CPU 111 determines whether or not a response to the download request has been received from the application management server 400 (S1103).

In a case where it is determined in S1103 that a response to the download request is not received from the application management server 400, the CPU 111 determines whether or not a timeout has occurred (S1104). In a case where it is determined in S1104 that the timeout has not occurred, the installation processing returns to S1103. In another case where it is determined in S1104 that a timeout has occurred, the installation processing ends.

In a case where it is determined in S1103 that a response to the download request has been received from the application management server 400, the CPU 111 determines whether or not the application can be downloaded (S1105). For example, in a case where a capacity for storing the newly added application cannot be secured in the ROM 112 or the storage 114, it is determined that the application cannot be downloaded. In this case, the installation processing ends. On the other hand, in a case where a capacity for storing the newly added application can be secured in the ROM 112 or the storage 114, it is determined that the application can be downloaded. In this case, the installation processing proceeds to S1106.

In S1106, the CPU 111 downloads an application installer. The application installer is stored in the storage 114. Next, the CPU 111 installs the application (newly added application) downloaded from the application management server 400 using the application installer (S1107), and ends this installation processing.

Figure 12:
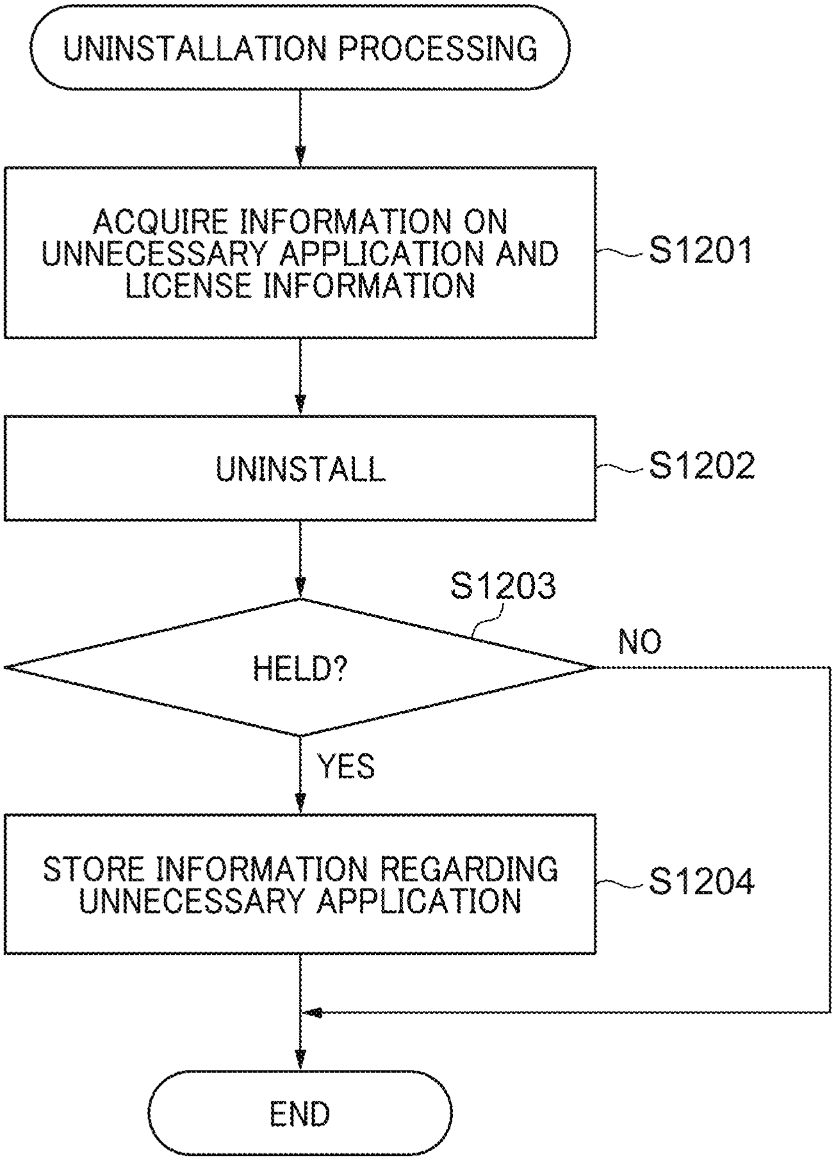
FIG. 12 is a flowchart illustrating a procedure of uninstallation processing in S1009 of FIG. 10.

FIG. 12 is a flowchart illustrating a procedure of uninstallation processing in S1009 of FIG. 10.

In FIG. 12, the CPU 111 acquires information on an unnecessary application and license information on the unnecessary application from the acquired subscription information (S1201). Next, the CPU 111 uninstalls the unnecessary application (S1202). Next, the CPU 111 determines whether or not to hold the information regarding the unnecessary application acquired in S1201 (S1203). For example, in accordance with an instruction from the CPU 111, a selection screen is displayed on the operation part 116 of the image forming apparatus 100, the selection screen allowing the user to select whether or not to hold information regarding an unnecessary application, and the determination in S1203 is performed in accordance with the user's selection on the selection screen.

In a case where it is determined in S1203 that the information regarding the unnecessary application acquired in S1201 is not to be held, the uninstallation processing ends. In another case where it is determined in S1203 that the information regarding the unnecessary application acquired in S1201 is to be held, the uninstallation processing proceeds to S1204. In S1204, the CPU 111 stores the information on the unnecessary application acquired in S1201 and the license information of the application in the storage 114 as the information on the unnecessary application. As a result, these pieces of information can be easily used when the application is reinstalled. Thereafter, the uninstallation processing ends.

According to the embodiment described above, the CPU 111 specifies an application that adds, to the image forming apparatus 100, a function of the image forming apparatus 100 permitted to be used in the plan subscribed by the user. The CPU 111 downloads the specified application from the application management server 400 and installs the specified application onto the image forming apparatus 100. As a result, it is possible to reduce the time and effort of installing the application for adding the function corresponding to the subscription plan to the image forming apparatus 100.

In the above-described embodiment, the image forming apparatus 100 specifies an application to be installed onto the image forming apparatus 100 on the basis of the subscription information acquired from the device management server 200. The subscription information includes an application list indicating applications for implementing functions permitted to be used in the subscription plan. As a result, in the configuration in which the image forming apparatus 100 acquires the subscription information including the application list from the device management server 200, it is possible to reduce the time and effort of installing the application for adding the function corresponding to the subscription plan to the image forming apparatus 100.

In the above-described embodiment, in a case where the user updates the subscription to change the plan to another plan, an unnecessary application among the applications installed onto the image forming apparatus 100 is uninstalled.

The unnecessary application is an application that implements a function permitted to be used in the plan before the change and not permitted to be used in the another plan after the change. As a result, it is possible to reduce the time and effort of uninstalling an application that becomes unnecessary due to the change of the plan from the image forming apparatus 100.

In the embodiment described above, the application installed onto the image forming apparatus 100 may be an application for managing the image forming apparatus 100 from an external apparatus. As a result, it is possible to reduce the time and effort of installing an application for managing the image forming apparatus 100 from an external apparatus.

In the embodiment described above, the application installed onto the image forming apparatus 100 may an application that adds an extension function to the scanning function of the image forming apparatus 100. As a result, it is possible to reduce the time and effort of installing an application that extends the scanning function included in the image forming apparatus 100.

Next, a management system according to a second embodiment of the present invention will be described.

The second embodiment is basically the same or similar in configuration and operation as the first embodiment described above, and is different from the first embodiment described above in that an application list is not included in subscription information acquired by an image forming apparatus 100 from a device management server 200. Therefore, duplicate configurations and operations will not be described, and different configurations and operations will be described below.

Figure 13A:
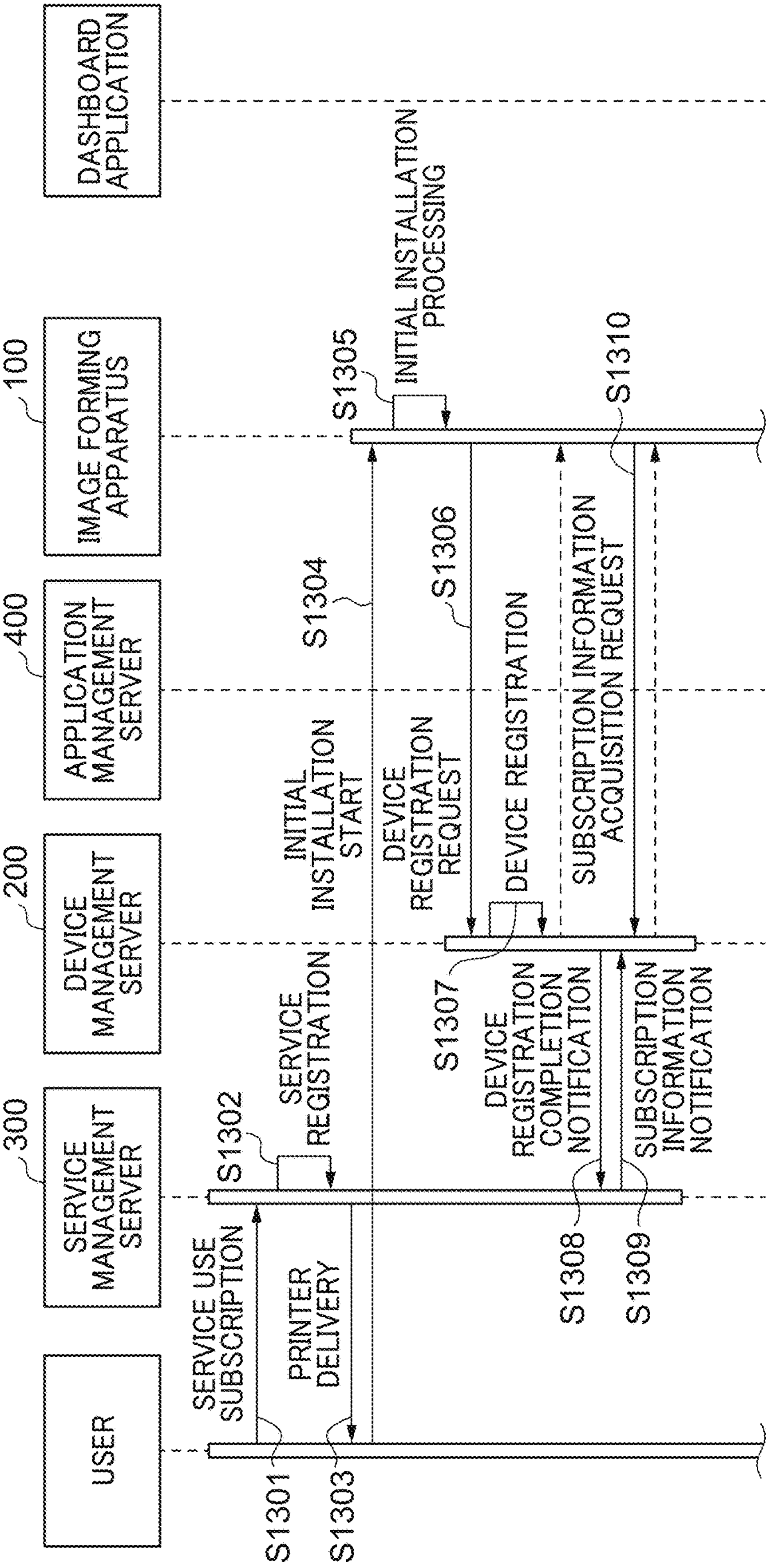
FIGS. 13A and 13B are sequence diagrams illustrating a procedure for allowing a user to start using a temporary printer-use service in a management system according to a second embodiment.
Figure 13B:
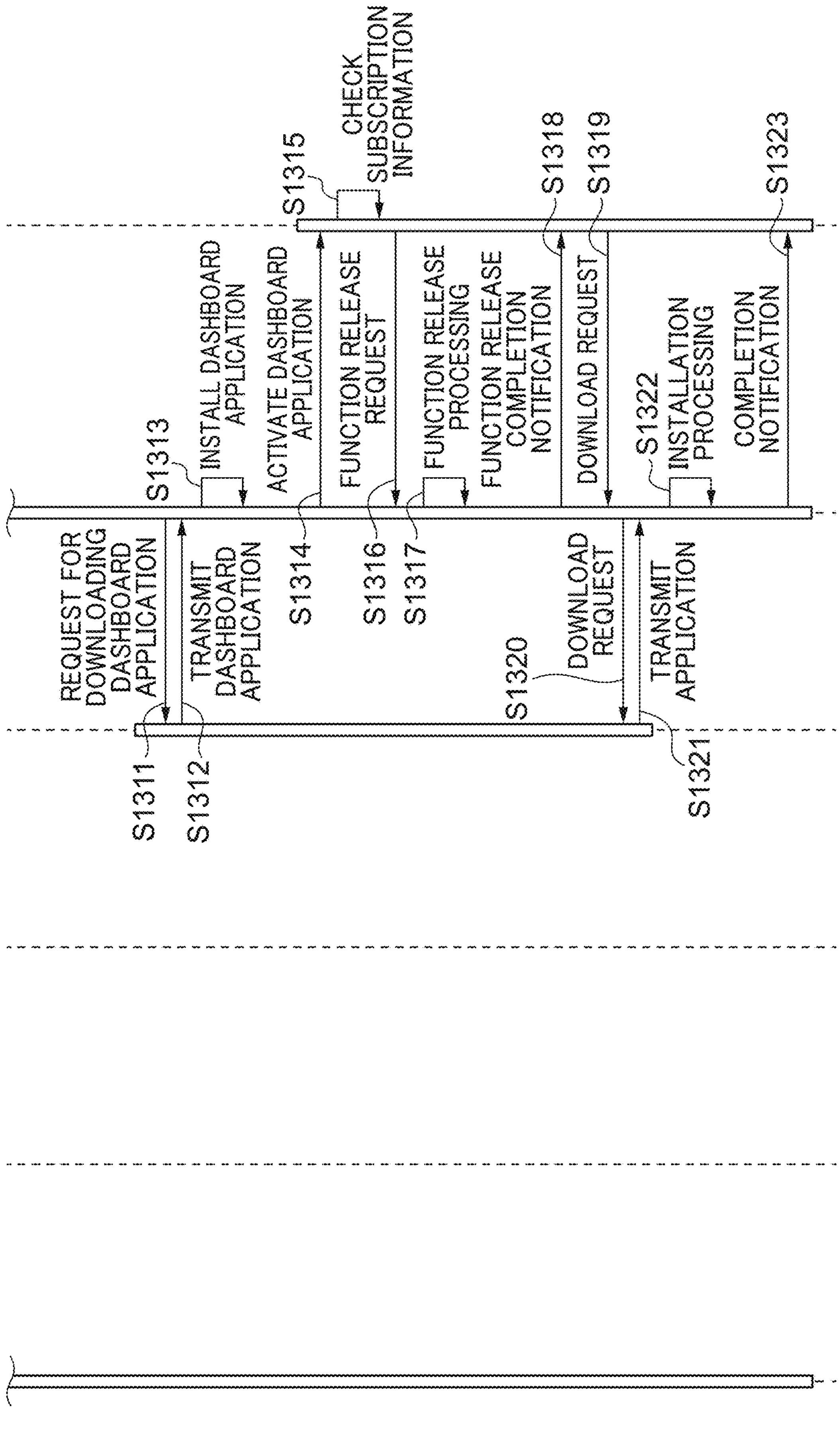

FIGS. 13A and 13B are sequence diagrams illustrating a procedure for allowing a user to start using a temporary printer-use service in a management system 10 according to the second embodiment. It should be noted that the processes from when a user makes a use subscription for a temporary printer-use service using a PC or the like (S1301) to when an image forming apparatus 100 transmits an acquisition request for the subscription information to a device management server 200 (S1310) is similar to the processes of S701 to S710 described above. Hereinafter, subsequent processing will be described.

The image forming apparatus 100 acquires subscription information from the device management server 200. The subscription information is information used for activation at the time of initial setting of the image forming apparatus 100 indicated by identification information included in a device registration completion notification, and includes information for determining that a subscription has been concluded. This subscription information further includes information indicating a subscription plan such as a print-only plan, a basic plan, an encryption scanning plan, a data-sorting scanning plan, or an encryption and data-sorting scanning plan. However, this subscription information does not include an application list or license information included in the subscription information in the first embodiment described above.

Next, the image forming apparatus 100 transmits a download request for the dashboard application to an application management server 400 (S1311). The image forming apparatus 100 also transmits license information on the dashboard application to the application management server 400. It should be noted that in the present embodiment, it is assumed that license information of each of the dashboard application, the encryption scanning application, and the data-sorting scanning application is stored in advance in a storage 114 or the like.

In a case where there is no problem in the received license information, the application management server 400 transmits the dashboard application to the image forming apparatus 100 (S1312).

The image forming apparatus 100 installs the dashboard application downloaded from the application management server 400 (S1313), and activates the dashboard application (S1314).

The dashboard application checks the subscription information stored in the storage 114 of the image forming apparatus 100 (S1315). The dashboard application specifies a subscription plan from the subscription information, and uses a subscription plan table 600 possessed by the dashboard application to specify an application for implementing a function permitted to be used in the subscription plan. Next, the dashboard application makes a function release request to a CPU 111 of the image forming apparatus 100 (S1316).

The image forming apparatus 100 performs the function release processing described above according to the function release request (S1317). When the function release processing is completed, the CPU 111 of the image forming apparatus 100 notifies the dashboard application of the completion of the function release (S1318).

The dashboard application requests the CPU 111 of the image forming apparatus 100 to download an application to be installed (S1319). The application to be installed is an application for implementing a function permitted to be used in the subscription plan, other than the dashboard application. The image forming apparatus 100 transmits the download request to the application management server 400 (S1320). The image forming apparatus 100 also transmits license information of the application to be installed to the application management server 400.

In a case where there is no problem in the received license information, the application management server 400 that has received the download request transmits an application corresponding to the download request to the image forming apparatus 100 (S1321).

The image forming apparatus 100 performs the above-described installation processing (S1322) and installs the application downloaded from the application management server 400. In addition, the CPU 111 of the image forming apparatus 100 notifies the dashboard application that the installation of the application to be installed has been completed (S1323), and this processing ends. The installed application requests the dashboard application to confirm the subscription information when the application is activated. When it is determined that the use of this application is valid from the subscription information stored in the storage 114 and the subscription plan table 600, the dashboard application permits the execution of this application.

Figure 14A:
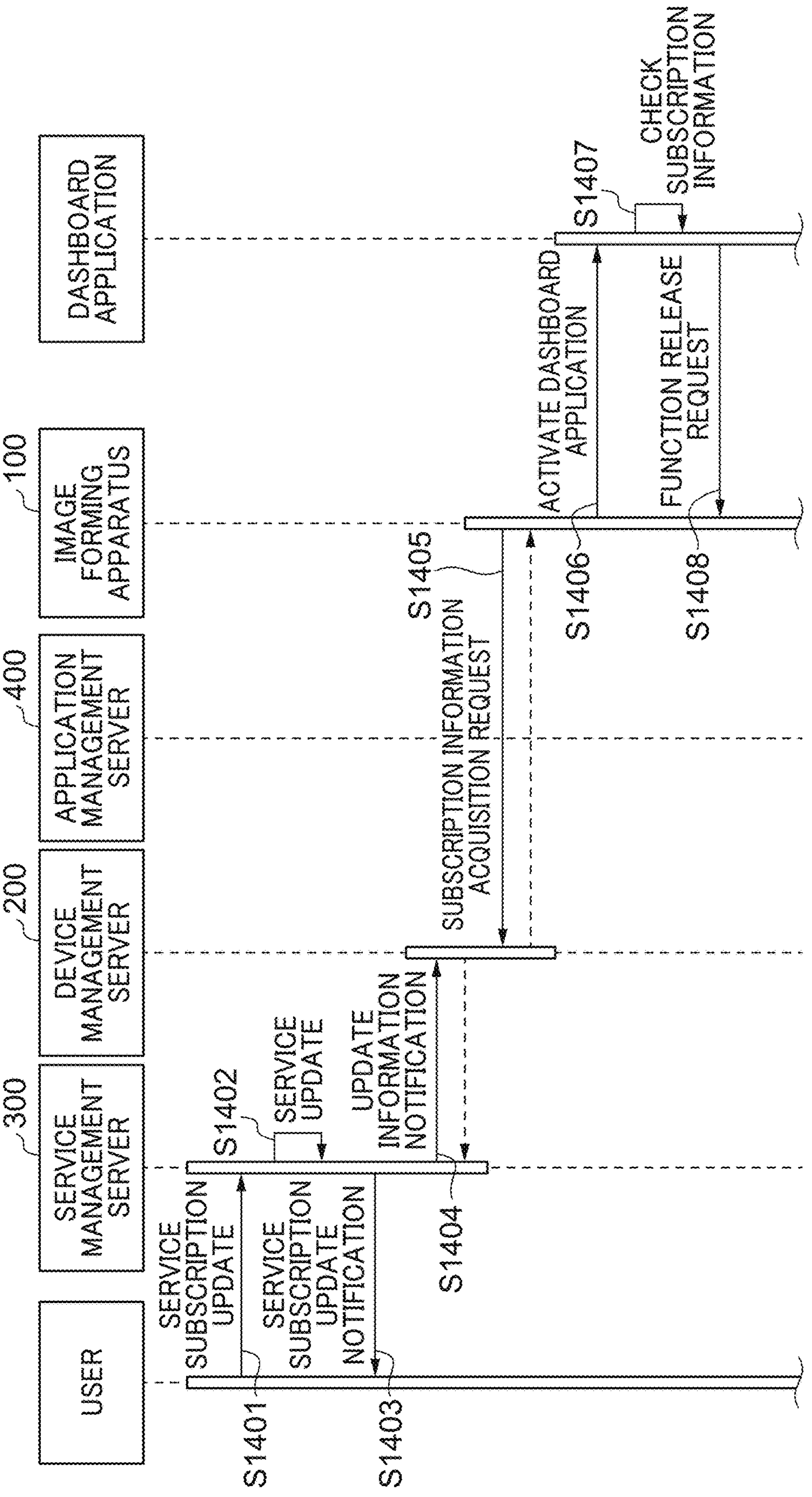
FIGS. 14A and 14B are sequence diagrams illustrating a procedure for allowing a user to update the subscription of the temporary printer-use service in the management system according to the second embodiment.
Figure 14B:
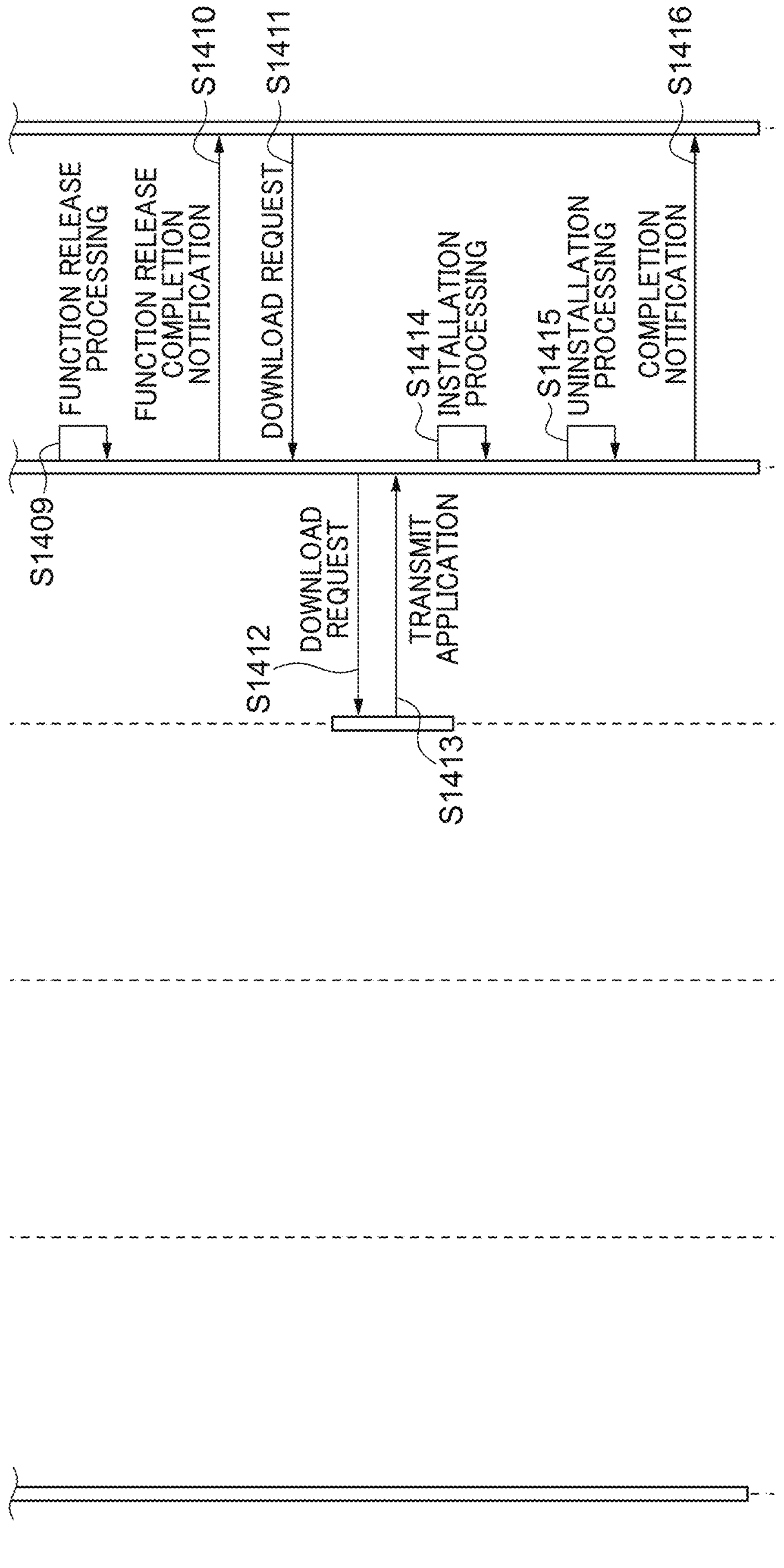

FIGS. 14A and 14B are sequence diagrams illustrating a procedure for allowing a user to update the subscription of the temporary printer-use service in the management system 10 according to the second embodiment. It should be noted that the processes in FIGS. 14A and 14B are performed at a predetermined timing between the completion of the processes in FIGS. 13A and 13B described above and the reaching of the subscription period corresponding to the subscription plan. It should be noted that the processes from when the user updates the subscription to the temporary printer-use service using a PC or the like (S1401) to when the image forming apparatus 100 transmits an acquisition request for subscription information to the device management server 200 (S1405) is similar to the processes of S801 to S805 described above. Hereinafter, subsequent processing will be described.

The image forming apparatus 100 acquires subscription information from the device management server 200. The subscription information is information used for activation at the time of initial setting of the image forming apparatus 100 indicated by identification information included in a device registration completion notification, and includes information for determining that a subscription has been concluded. This subscription information further includes information indicating a subscription plan such as a print-only plan, a basic plan, an encryption scanning plan, a data-sorting scanning plan, or an encryption and data-sorting scanning plan. However, this subscription information does not include an application list or license information included in the subscription information in the first embodiment described above.

The image forming apparatus 100 activates the dashboard application (S1406), and the dashboard application checks the acquired subscription information (S1407). The dashboard application checks whether or not there is a change in the basic function(s) permitted to be used by the subscription update, and if there is a change, makes a function release request to the CPU 111.

The image forming apparatus 100 performs the function release processing described above according to the function release request (S1409). When the function release process is completed, the CPU 111 of the image forming apparatus 100 notifies the dashboard application of the completion of the function release (S1410).

Next, the dashboard application checks the acquired subscription information, and checks whether or not there is a change in the function that is permitted to be used by the subscription update and is implemented by the application. In a case where there is a function newly permitted to be used by the subscription update, the dashboard application requests the CPU 111 of the image forming apparatus 100 to download an application to be installed (S1411). The application to be installed is an application for implementing a function newly permitted to be used by the subscription update. The image forming apparatus 100 transmits the download request to the application management server 400 (S1412). The image forming apparatus 100 also transmits license information of the application to be installed to the application management server 400.

In a case where there is no problem in the received license information, the application management server 400 that has received the download request transmits an application corresponding to the download request to the image forming apparatus 100 (S1413).

The image forming apparatus 100 performs the above-described installation processing (S1414) and installs the application downloaded from the application management server 400. The image forming apparatus 100 performs the uninstallation processing described above (S1415), and uninstalls unnecessary applications.

Next, the CPU 111 of the image forming apparatus 100 notifies the dashboard application that installation of an application to be installed and uninstallation of an unnecessary application have been completed (S1416).

It should be noted that, in a case where the temporary printer-use service is cancelled in the subscription update in S1401, all of the dashboard application, the encryption scanning application, and the data-sorting scanning application installed in the processes in FIGS. 13A and 13B are uninstalled.

When the process of S1416 is completed, the processes in FIGS. 14A and 14B end.

In the second embodiment described above, the image forming apparatus 100 specifies an application to be installed onto the image forming apparatus 100 on the basis of the subscription information acquired from the device management server 200 and the subscription plan table 600 held by the image forming apparatus 100. The subscription information does not include an application list indicating an application for implementing a function corresponding to the subscription plan. As a result, in the configuration in which the image forming apparatus 100 acquires the subscription information not including the application list from the device management server 200, it is possible to reduce the time and effort of installing the application for adding the function corresponding to the subscription plan.

It should be noted that the CPU 111 may be configured to perform the processing performed by the dashboard application in the second embodiment.

Next, a management system according to the third embodiment of the present invention will be described.

The configuration and operation of the third embodiment are basically the same or similar as those of the first and second embodiments described above. However, the third embodiment is different from the first and second embodiments described above in that the subscription plan is not designated at the stage of the use subscription of the temporary printer-use service, and a user designates the subscription plan when the image forming apparatus 100 is delivered to the user. Therefore, duplicate configurations and operations will not be described, and different configurations and operations will be described below.

Figure 15A:
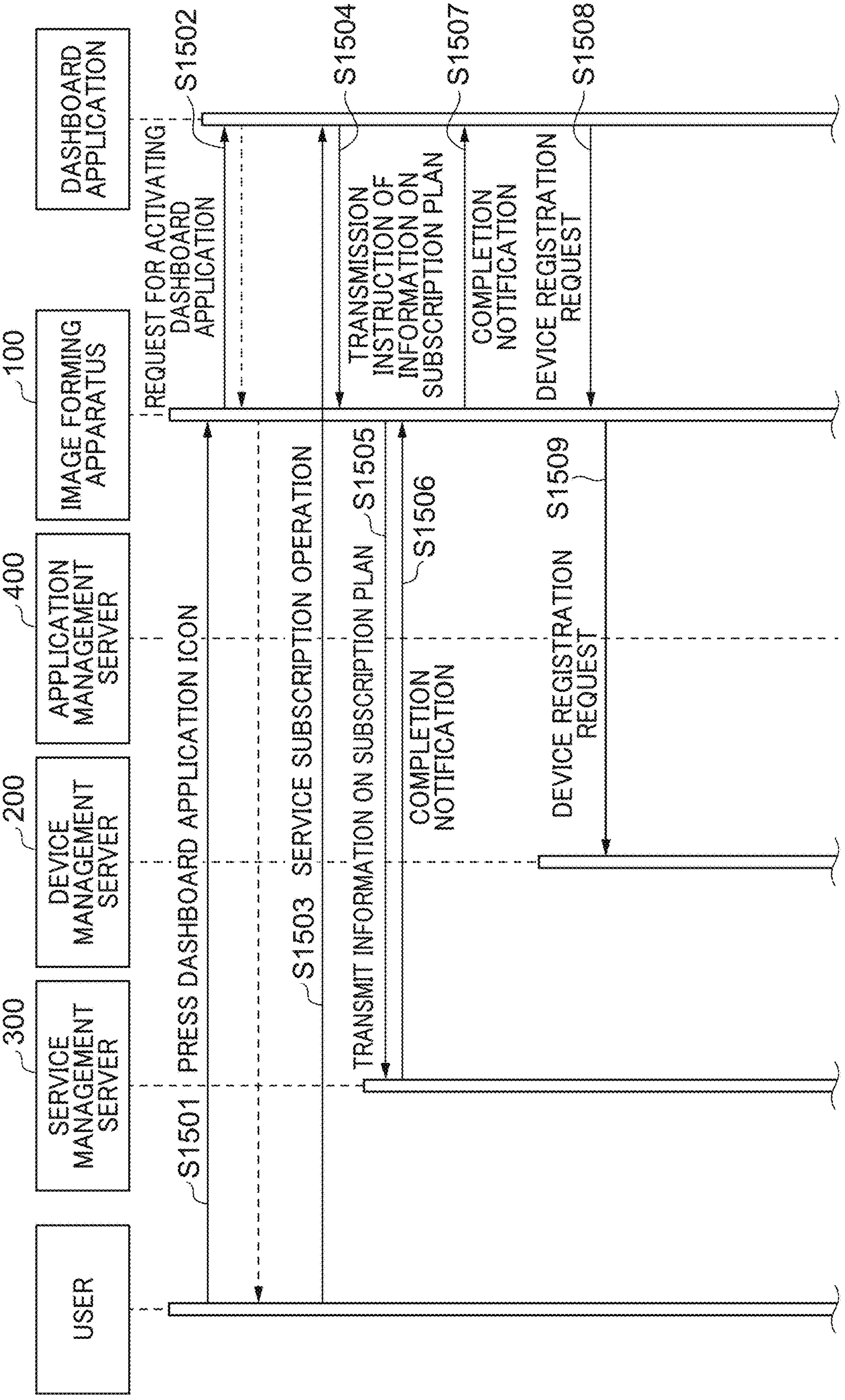
FIGS. 15A and 15B are sequence diagrams illustrating a procedure for allowing a user to start using a temporary printer-use service in a management system according to a third embodiment.
Figure 15B:
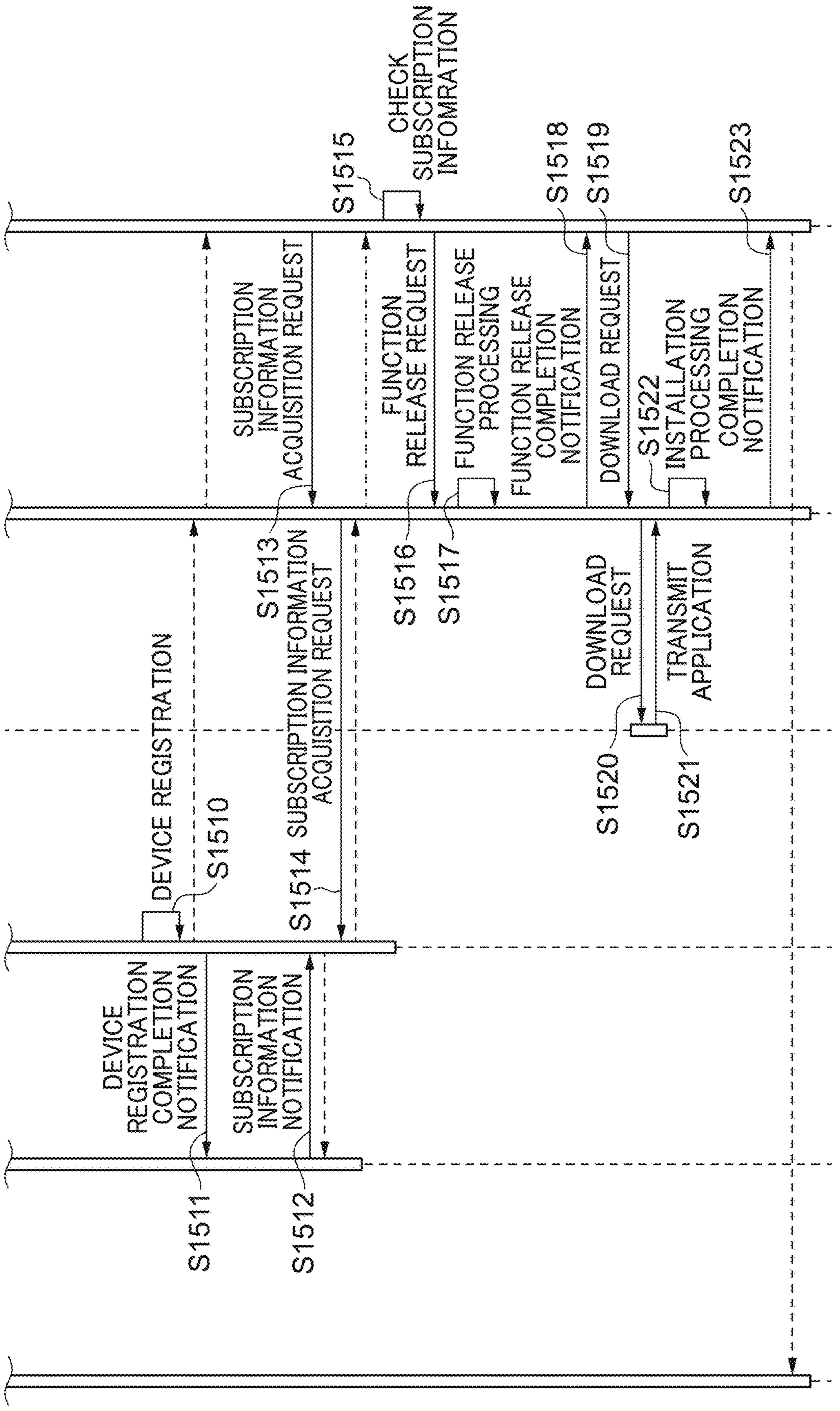

FIGS. 15A and 15B are sequence diagrams illustrating a procedure for allowing a user to start using a temporary printer-use service in a management system 10 according to the third embodiment. The processes in FIGS. 15A and 15B are executed after an image forming apparatus 100 is delivered to a user and the initial installation processing is completed, according to the use subscription of the temporary printer-use service of the printer performed by the user in advance. It is assumed that a dashboard application has already been installed onto the image forming apparatus 100. It should be noted that the processes in FIGS. 15A and 15B are similar to the processes in FIGS. 13A and 13B described above, and details different from the processes in FIGS. 13A and 13B described above will be particularly described below.

In FIG. 15A, first, when a user presses a dashboard application icon (which is not illustrated) displayed on an operation part 116 of the image forming apparatus 100 (S1501), the image forming apparatus 100 activates the dashboard application (S1502). When the dashboard application is activated, an operation screen for designating a subscription plan and updating a subscription is displayed on the operation part 116.

The user performs a service subscription operation on this operation screen (S1503). In this service subscription operation, specifically, the subscription plan is specified by the user. The information on the designated subscription plan is temporarily held in a RAM 113 or the like. The dashboard application instructs a CPU 111 of the image forming apparatus 100 to transmit information on the designated subscription plan (S1504). In accordance with the transmission instruction, the image forming apparatus 100 transmits the information on the designated subscription plan to a service management server 300 (S1505). At this time, for example, identification information on the image forming apparatus 100, a user ID of the user who has made the use subscription of a temporary printer-use service, and the like are also transmitted to the service management server 300 as the information that can be used for specifying a transmission source of the information on the subscription plan.

The service management server 300 performs service subscription processing of associating the information of the subscription plan with the information registered at the time of the use subscription of the temporary printer-use service. The service management server 300 that has completed the service subscription processing notifies the image forming apparatus 100 of the completion of the service subscription processing (S1506).

The CPU 111 of the image forming apparatus 100 that has received this notification notifies the dashboard application of the completion of the service subscription processing (S1507). The dashboard dash beat application that has received this notification stores information on the specified subscription plan in a storage 114. Next, the dashboard application makes a device registration request to the CPU 111 of the image forming apparatus 100 (S1508). In accordance with this request, the image forming apparatus 100 transmits a device registration request to a device management server 200 (S1509). The image forming apparatus 100 also transmits identification information such as a product serial number of the image forming apparatus 100 to the device management server 200.

The device management server 200 that has received the device registration request performs device registration processing of registering the identification information received from the image forming apparatus 100 (S1510). Next, the device management server 200 returns the result of the device registration processing to the image forming apparatus 100. The device management server 200 transmits a device registration completion notification including the identification information of the registered image forming apparatus 100 to the service management server 300 (S1511).

Upon receiving the device registration completion notification, the service management server 300 creates subscription information and notifies the device management server 200 of the created subscription information (S1512). The subscription information is information used for activation at the time of initial setting of the image forming apparatus 100 indicated by identification information included in a device registration completion notification, and includes information for determining that a subscription has been concluded. However, this subscription information does not include the information indicating the subscription plan designated by the user, the application list, and the license information.

The device management server 200 holds the subscription information notified from the service management server 300 in the storage 204 or the like of the device management server 200, and waits until receiving an acquisition request for the subscription information from the image forming apparatus 100.

On the other hand, the dashboard application requests the CPU 111 of the image forming apparatus 100 to acquire subscription information (S1513). In response to this request, the image forming apparatus 100 transmits an acquisition request for the subscription information to the device management server 200 (S1514).

The device management server 200 transmits the subscription information to the image forming apparatus 100 in accordance with the received acquisition request. The CPU 111 of the image forming apparatus 100 that has received the subscription information notifies the dashboard application of the subscription information. The dashboard application includes the information of the subscription plan stored in the storage 114 in the received subscription information, and stores the revised subscription information in the storage 114. Thereafter, processes of S1515 to S1523, which are processes similar to the above-described processes of S1315 to S1323, are performed using the revised subscription information.

As described above, in the third embodiment, the image forming apparatus 100 causes a user to designate a plan to be subscribed from among the plurality of plans through the operation part 116, and specifies the application to be installed on the basis of not the information received from the device management server 200 but the information of the subscription plan designated by the user through the operation part 116.

Figure 16A:
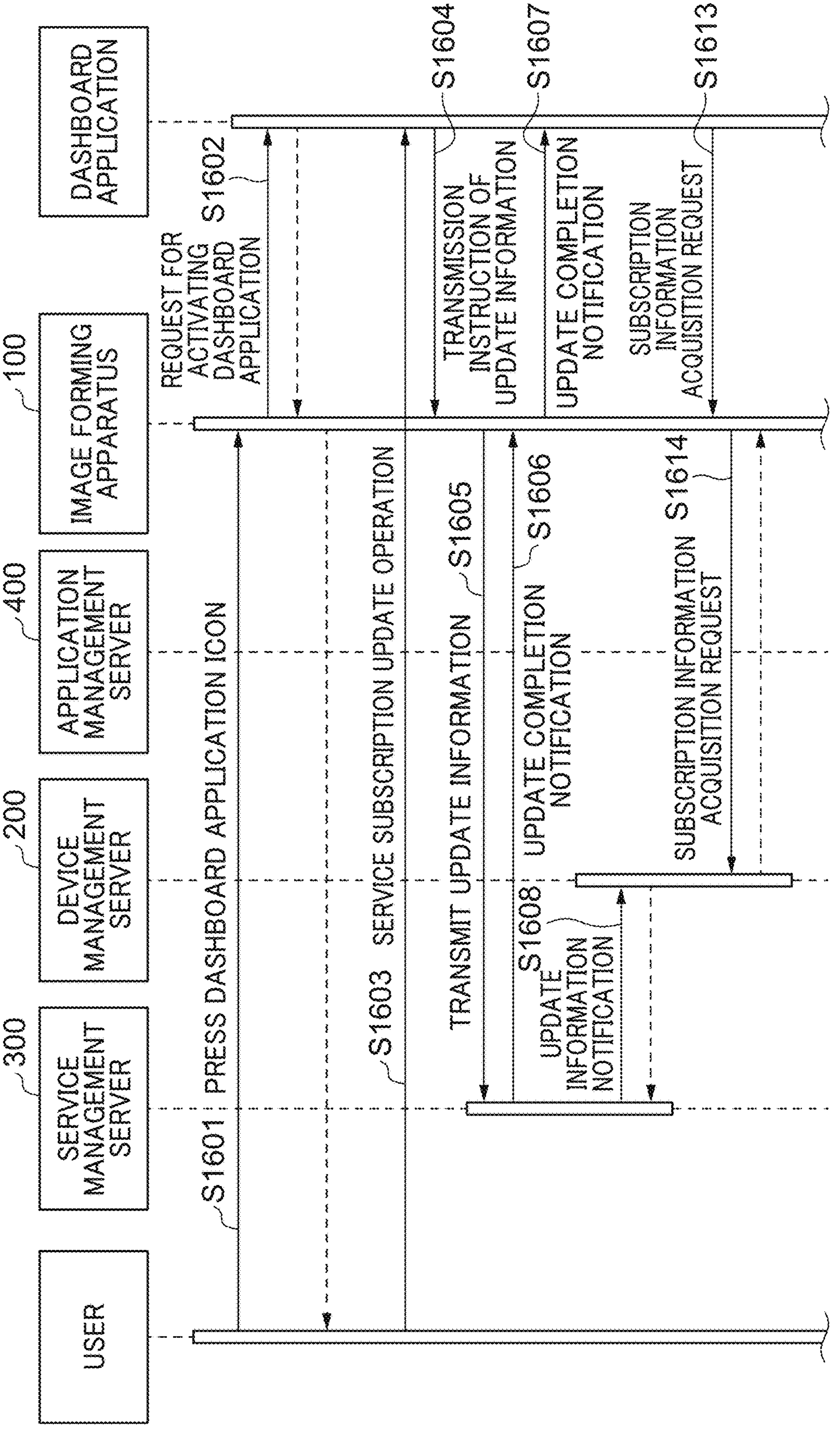
FIGS. 16A and 16B are sequence diagrams illustrating a procedure for allowing a user to update the subscription of the temporary printer-use service in the management system according to the third embodiment.
Figure 16B:
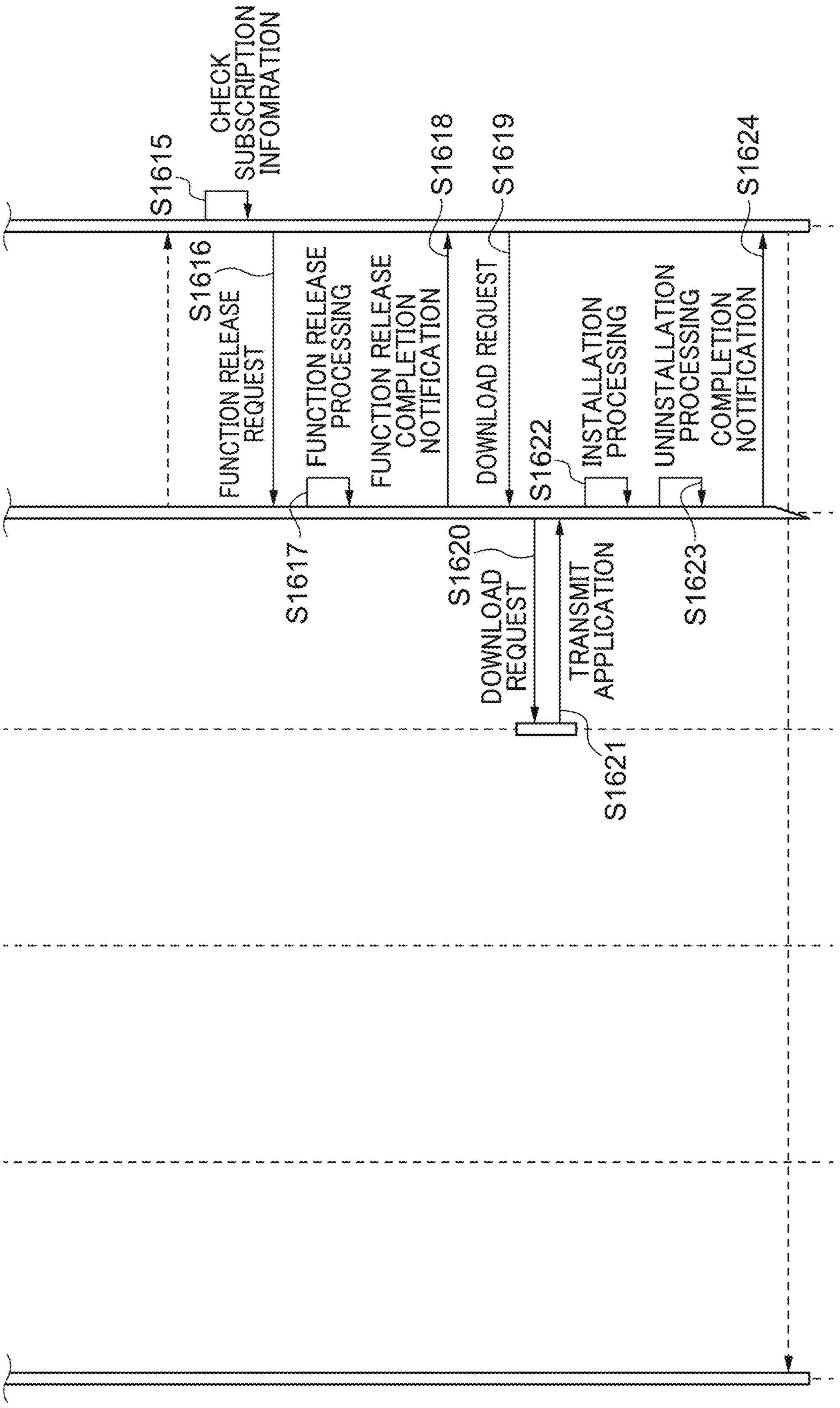

FIGS. 16A and 16B are sequence diagrams illustrating a procedure for allowing a user to update the subscription of the temporary printer-use service in the management system 10 according to the third embodiment. The processes in FIGS. 16A and 16B are performed at a predetermined timing between the completion of the processes in FIGS. 15A and 15B described above and the reaching of the subscription period corresponding to the subscription plan. It should be noted that the processes in FIGS. 16A and 16B are similar to the processes in FIGS. 14A and 14B described above, and details different from the processes in FIGS. 14A and 14B described above will be particularly described below.

In FIG. 16A, when a user presses a dashboard application icon (not illustrated) displayed on the operation part 116 of the image forming apparatus 100 (S1601), the image forming apparatus 100 starts a dashboard application (S1602). When the dashboard application is activated, the operation part 116 displays an operation screen for designating the subscription plan and updating the subscription as described above.

The user performs a service subscription updating operation on this operation screen (S1603). In this service subscription updating operation, for example, an operation of changing the subscription plan to another plan is performed by the user. Information indicating the subscription plan after the change is temporarily held in the RAM 113 or the like. The dashboard application instructs the CPU 111 of the image forming apparatus 100 to transmit update information including information indicating the subscription plan after the change (S1604). In accordance with this transmission instruction, the image forming apparatus 100 transmits update information to the service management server 300 (S1605). At this time, for example, the identification information of the image forming apparatus 100, the user ID of the user who has made the use subscription of the temporary printer-use service, and the like are also transmitted to the service management server 300 as the information that can be used for specifying the transmission source of the update information.

The service management server 300 that has received the update information performs service subscription update processing of updating the registered information on the basis of the update information. The service management server 300 that has completed the service subscription update processing notifies the image forming apparatus 100 of update completion (S1606). The service management server 300 notifies the device management server 200 of the update information (S1608).

On the other hand, the CPU 111 of the image forming apparatus 100 that has received the notification of update completion from the service management server 300 notifies the dashboard application of update completion (S1607). The dashboard application that has received this notification requests the CPU 111 of the image forming apparatus 100 to acquire subscription information (S1613). In response to the acquisition request, the image forming apparatus 100 transmits an acquisition request for the subscription information to the device management server 200 (S1614).

The device management server 200 transmits the subscription information to the image forming apparatus 100 in accordance with the received acquisition request. The subscription information is information used for activation at the time of initial setting of the image forming apparatus 100 indicated by identification information included in a device registration completion notification, and includes information for determining that a subscription has been concluded. However, the subscription information does not include the information indicating the subscription plan after the change, the application list, and the license information.

The CPU 111 of the image forming apparatus 100 that has received the subscription information notifies the dashboard application of the subscription information. The dashboard application includes the information of the changed subscription plan held in the RAM 113 or the like in the received subscription information, and stores the revised subscription information in the storage 114. Thereafter, processes of S1615 to S1624, which are processes similar to the above-described processes of S1407 to S1416, are performed using the revised subscription information.

As described above, in the third embodiment, even at the time of subscription update, the image forming apparatus 100 specifies the application to be installed on the basis of not the information received from the device management server 200 but the information of the subscription plan changed by the user through the operation part 116. As a result, in the configuration in which the user specifies the subscription plan through the operation part 116 of the image forming apparatus 100, it is possible to reduce the time and effort of installing the application for adding the function corresponding to the subscription plan.

It should be noted that the processes performed by the dashboard application in the third embodiment may be performed by the CPU 111.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2023-111652, filed Jul. 6, 2023, which is hereby incorporated by reference wherein in its entirety.

What is claimed is:

1. An image forming apparatus communicably connected with a management server that manages a plurality of applications, the image forming apparatus comprising:

a memory storing instructions; and at least one processor that executes the instructions to:

specify a predetermined application that adds, to the image forming apparatus, a function of the image forming apparatus, permitted to be used in a plan subscribed by a user;

acquire the specified predetermined application from the management server;

install the acquired predetermined application onto the image forming apparatus; and in a case where the user updates a subscription to change the plan to another plan, uninstall, from the image forming apparatus, an application that implements a function permitted to be used in the plan before the change and not permitted to be used in the another plan after the change among applications installed onto the image forming apparatus.

2. The image forming apparatus according to claim 1, wherein the at least one processor executes the instructions to acquire subscription information including information indicating the predetermined application, and the predetermined application is specified on a basis of the information indicating the predetermined application included in the subscription information.

3. The image forming apparatus according to claim 1, wherein the at least one processor executes the instructions to:

acquire subscription information including information indicating a plan subscribed by the user; and hold management data that defines the predetermined application for each plan, and the predetermined application is specified on a basis of the information indicating the plan subscribed by the user included in the subscription information and of the management data.

4. The image forming apparatus according to claim 1, wherein the at least one processor executes the instructions to:

cause the user to designate a plan to be subscribed from among a plurality of plans; and hold management data that defines the predetermined application for each of the plurality of plans, and the predetermined application is specified on a basis of information indicating the plan designated by the user and of the management data.

5. The image forming apparatus according to claim 1, wherein the predetermined application is an application for managing the image forming apparatus from an external apparatus.

6. The image forming apparatus according to claim 1, wherein the predetermined application is an application that adds an extension function to a scanning function of the image forming apparatus.

7. A method for controlling an image forming apparatus communicably connected with a management server that manages a plurality of applications, the method comprising:

specifying a predetermined application that adds, to the image forming apparatus, a function of the image forming apparatus, permitted to be used in a plan subscribed by a user;

acquiring the specified predetermined application from the management server;

installing the acquired predetermined application onto the image forming apparatus; and in a case where the user updates a subscription to change the plan to another plan, uninstalling, from the image forming apparatus, an application that implements a function permitted to be used in the plan before the change and not permitted to be used in the another plan after the change among applications installed onto the image forming apparatus.

8. A non-transitory computer-readable storage medium storing a program for causing a computer to execute a method for controlling an image forming apparatus communicably connected with a management server that manages a plurality of applications, the method comprising:

specifying a predetermined application that adds, to the image forming apparatus, a function of the image forming apparatus, permitted to be used in a plan subscribed by a user;

acquiring the specified predetermined application from the management server;

installing the acquired predetermined application onto the image forming apparatus; and in a case where the user updates a subscription to change the plan to another plan, uninstalling, from the image forming apparatus, an application that implements a function permitted to be used in the plan before the change and not permitted to be used in the another plan after the change among applications installed onto the image forming apparatus.

9. A management system comprising:

an image forming apparatus;

a first server that manages information subscribed by a user;

a second server that manages a plurality of applications;

a memory storing instructions; and at least one processor that executes the instructions to:

specify, on a basis of the information managed by the first server, a predetermined application that adds, to the image forming apparatus, a function of the image forming apparatus, permitted to be used in a plan subscribed by a user;

acquire the specified predetermined application from the second server;

install the acquired predetermined application onto the image forming apparatus; and in a case where the user updates a subscription to change the plan to another plan, uninstall, from the image forming apparatus, an application that implements a function permitted to be used in the plan before the change and not permitted to be used in the another plan after the change among applications installed onto the image forming apparatus.

* * * * *